(12) United States Patent
Asano

(10) Patent No.: US 8,179,008 B2
(45) Date of Patent: May 15, 2012

(54) AXIAL GAP ROTARY ELECTRIC MACHINE

(75) Inventor: Yoshinari Asano, Shiga (JP)

(73) Assignee: Daikin Industries, Ltd., Osaka-Shi (JP)

( * ) Notice: Subject to any disclaimer, the term of this patent is extended or adjusted under 35 U.S.C. 154(b) by 230 days.

(21) Appl. No.: 12/677,426

(22) PCT Filed: Sep. 11, 2008

(86) PCT No.: PCT/JP2008/066405
§ 371 (c)(1),
(2), (4) Date: Mar. 10, 2010

(87) PCT Pub. No.: WO2009/035027
PCT Pub. Date: Mar. 19, 2009

(65) Prior Publication Data
US 2010/0207477 A1     Aug. 19, 2010

(30) Foreign Application Priority Data

Sep. 11, 2007   (JP) ................................ 2007-235377
Feb. 18, 2008   (JP) ................................ 2008-036519

(51) Int. Cl.
*H02K 21/24* (2006.01)

(52) U.S. Cl. ............................ 310/156.32; 310/156.37

(58) Field of Classification Search ............. 310/156.32, 310/156.33, 156.36, 156.37
See application file for complete search history.

(56) References Cited

U.S. PATENT DOCUMENTS

| | | | | |
|---|---|---|---|---|
| 7,990,019 | B2* | 8/2011 | Sung | 310/266 |
| 2006/0273676 | A1 | 12/2006 | Naruse et al. | |
| 2008/0088200 | A1* | 4/2008 | Ritchey | 310/268 |

FOREIGN PATENT DOCUMENTS

| | | | |
|---|---|---|---|
| JP | 61-185040 | A | 8/1986 |
| JP | 2003-199308 | A | 7/2003 |
| JP | 2006-353078 | A | 12/2006 |
| JP | 2007-202363 | A | 8/2007 |
| JP | 2008-043043 | * | 2/2008 |

* cited by examiner

*Primary Examiner* — Burton Mullins
(74) *Attorney, Agent, or Firm* — Birch, Stewart, Kolasch & Birch, LLP

(57) ABSTRACT

An axial gap rotary electric machine includes a rotor, an armature and a stator. The rotor is capable of rotating in a circumferential direction about a rotation axis. The rotor includes permanent magnets and magnetic plates which cover those from the armature side. The armature includes an armature coil opposed to the rotor from one side in a rotation axis direction parallel to the rotation axis. The stator is opposed to the rotor from the other side in the rotation axis direction.

18 Claims, 38 Drawing Sheets

F I G. 3
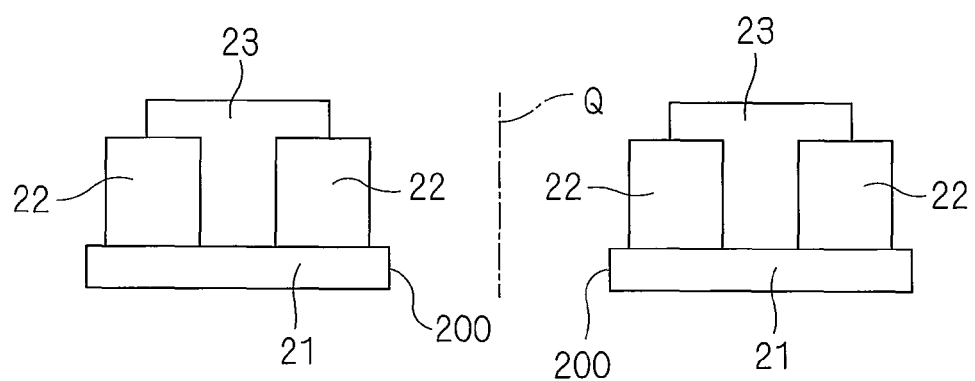
F I G. 4
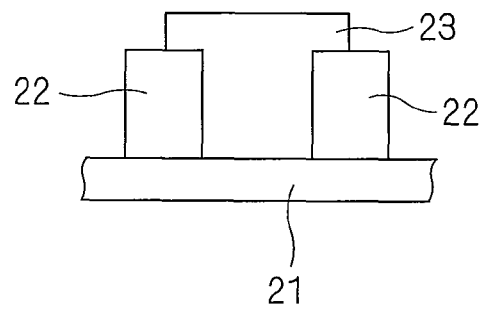

F I G . 2 0
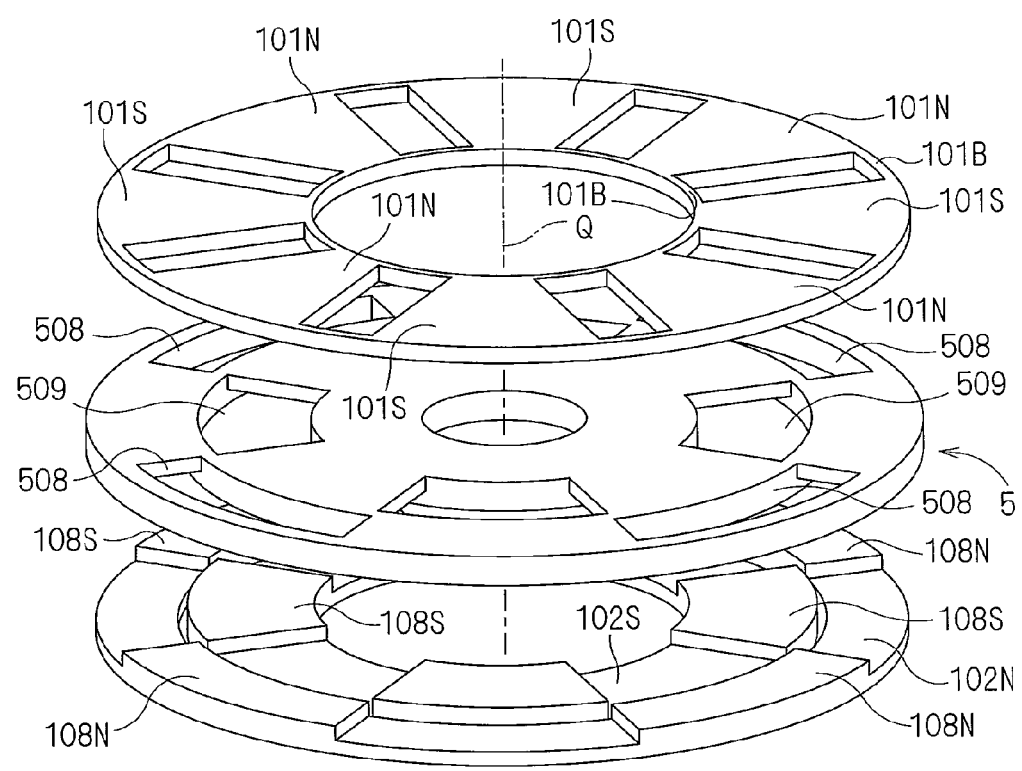

F I G . 2 1
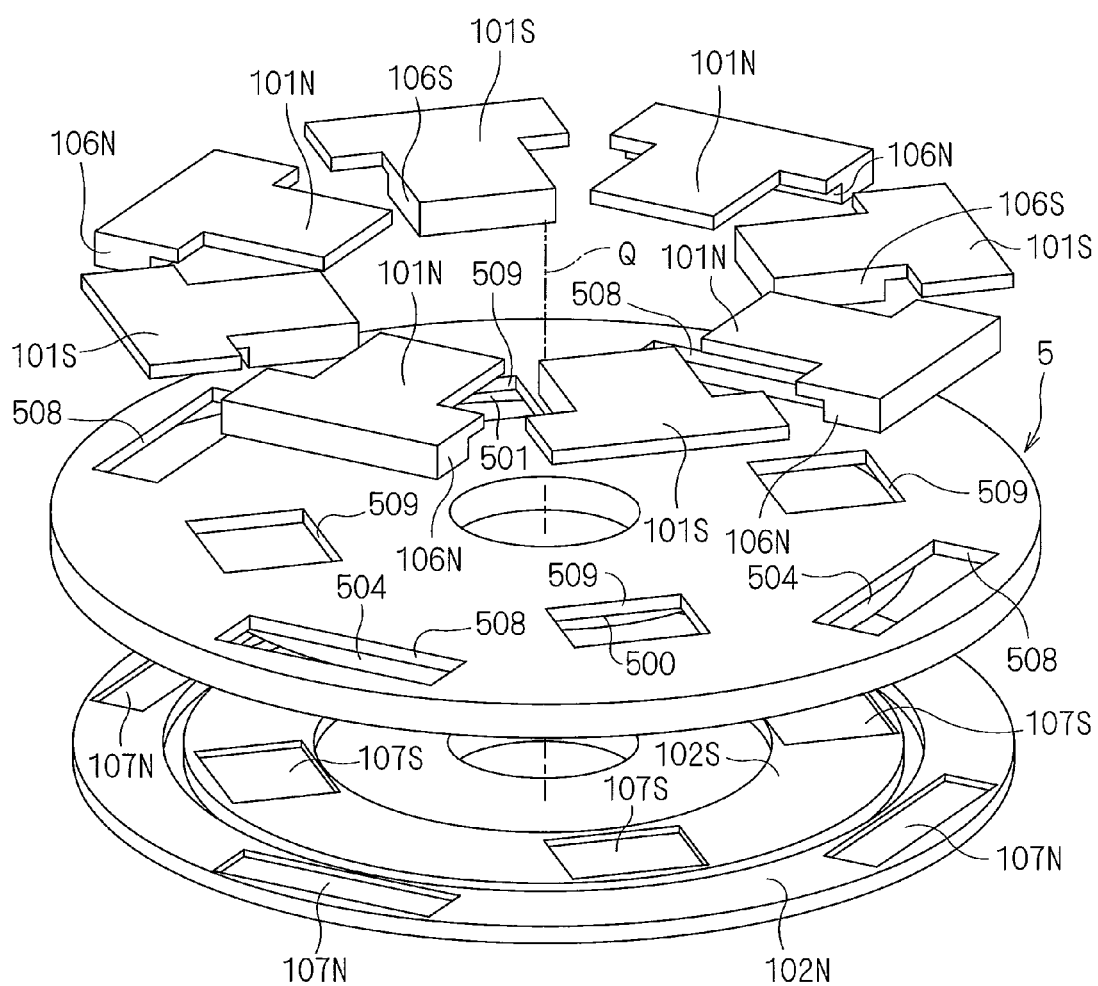

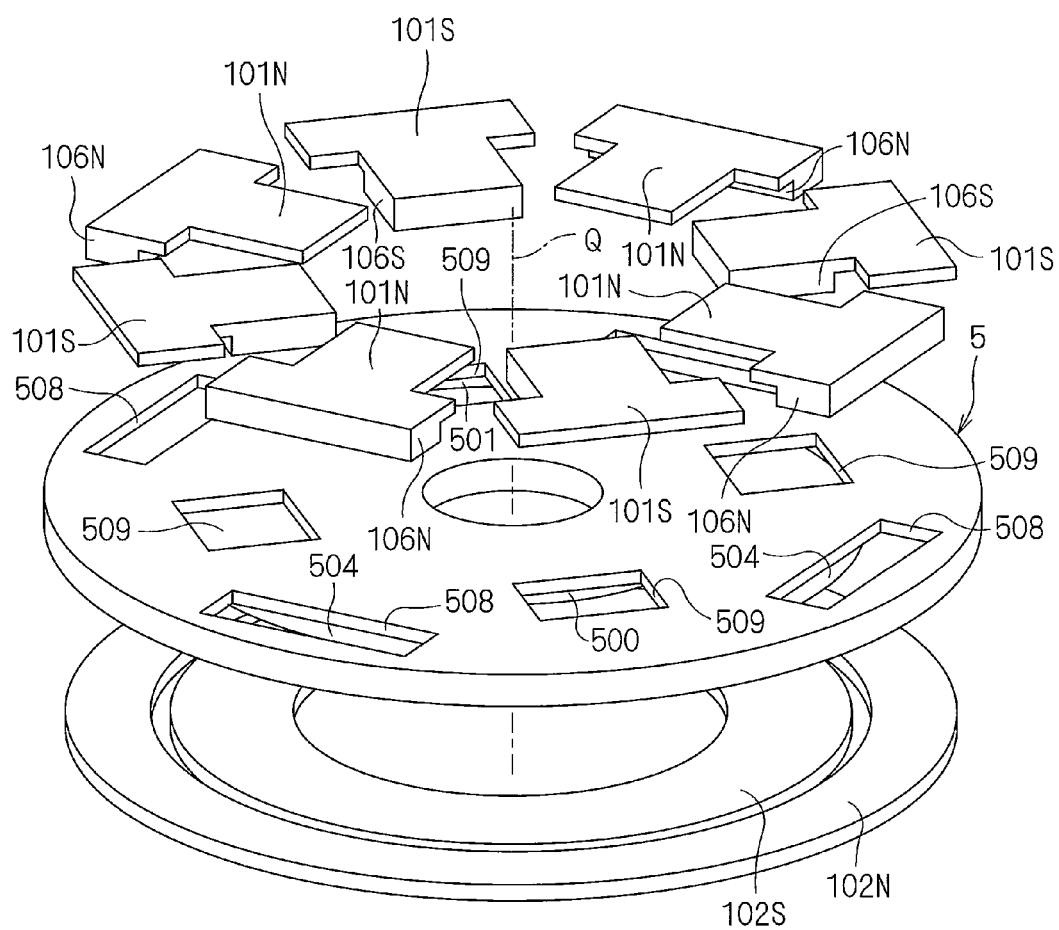
F I G . 2 4

F I G . 2 7
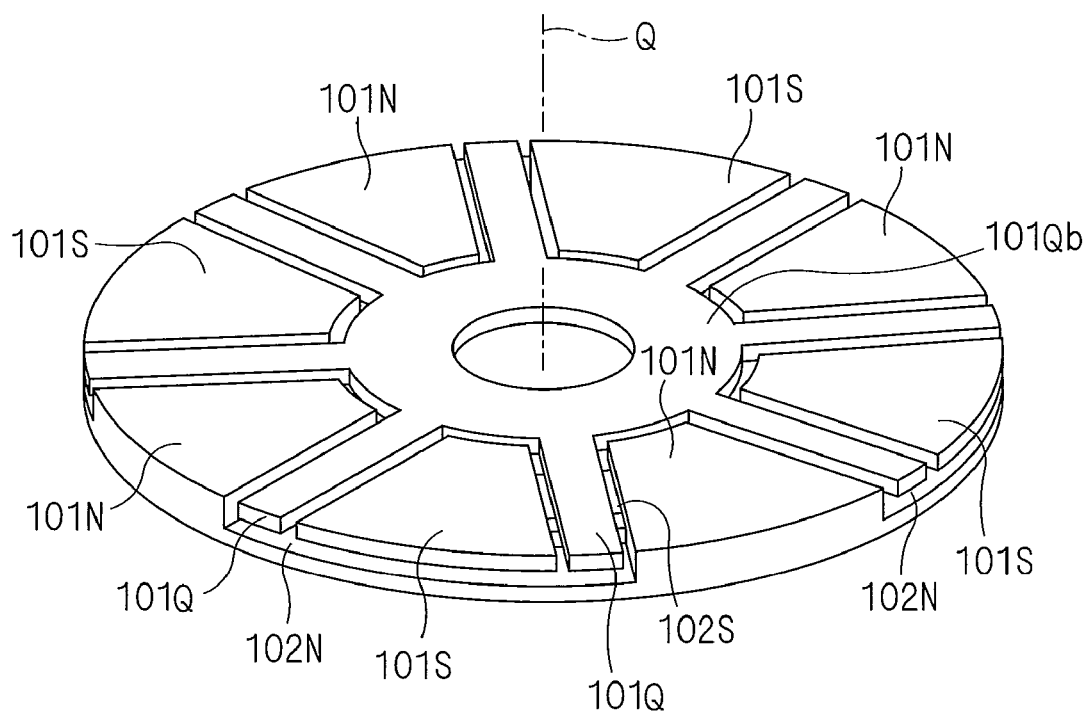

F I G. 3 0
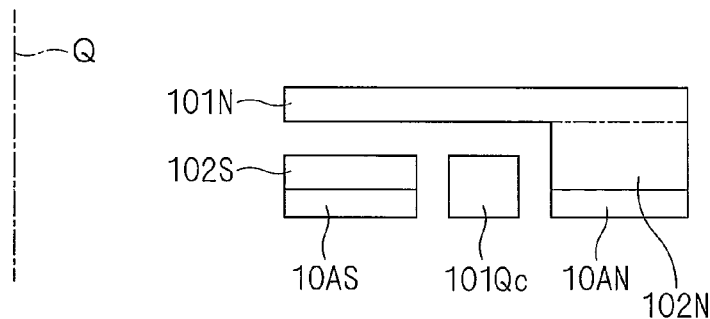
F I G. 3 1
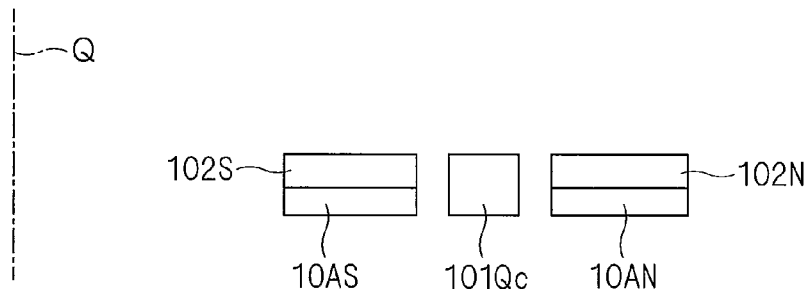
F I G. 3 2
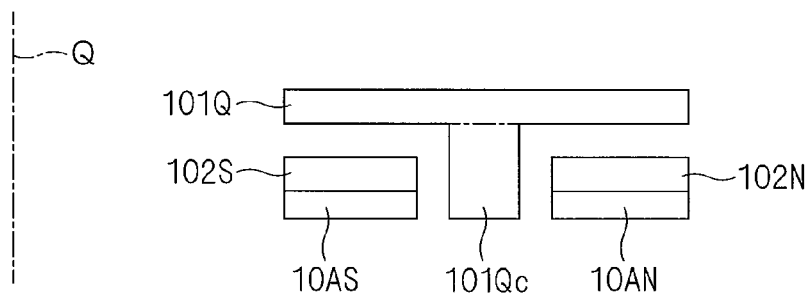
F I G. 3 3
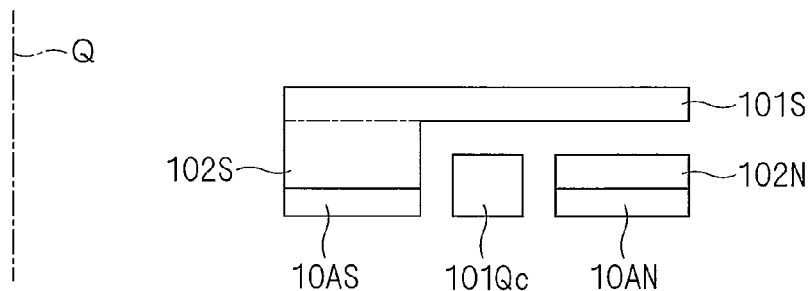

F I G . 3 7
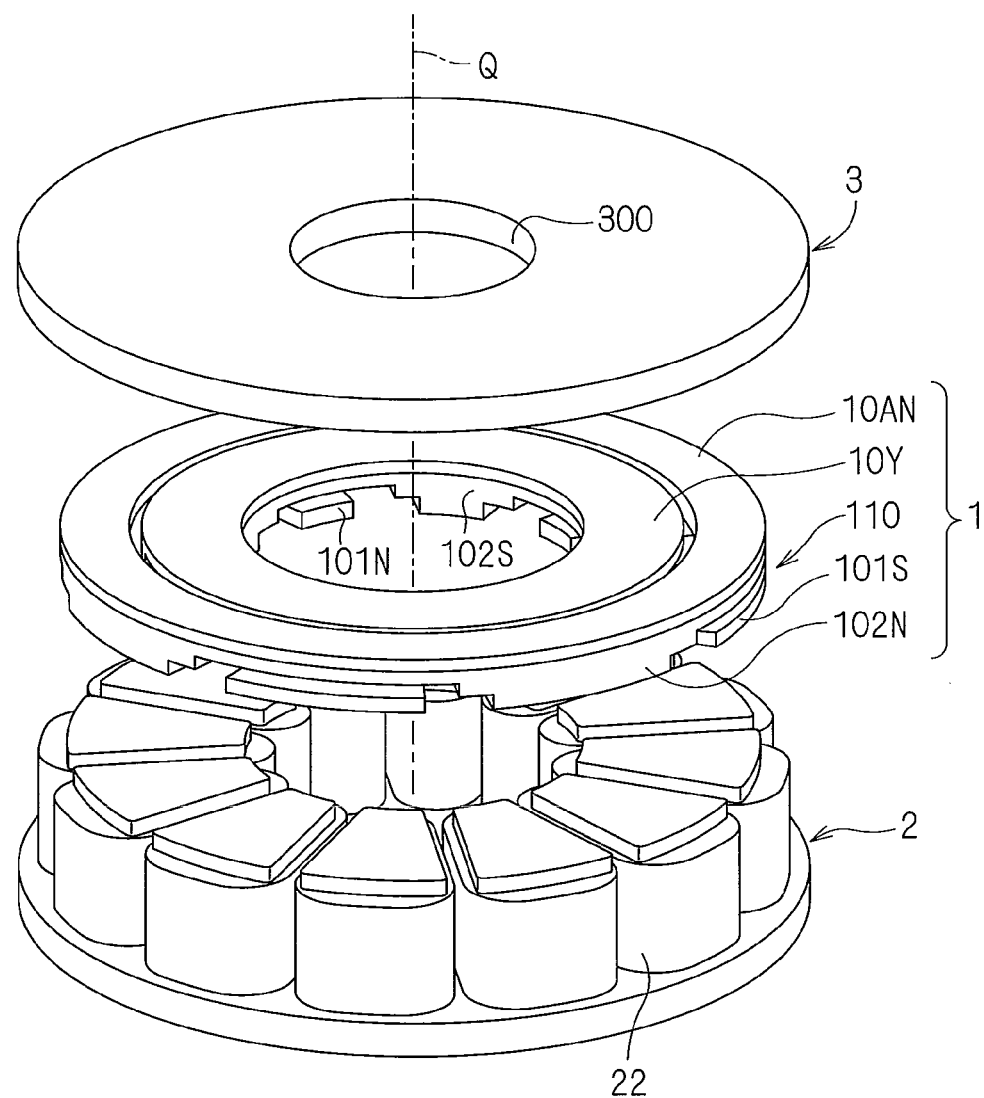

F I G . 4 0
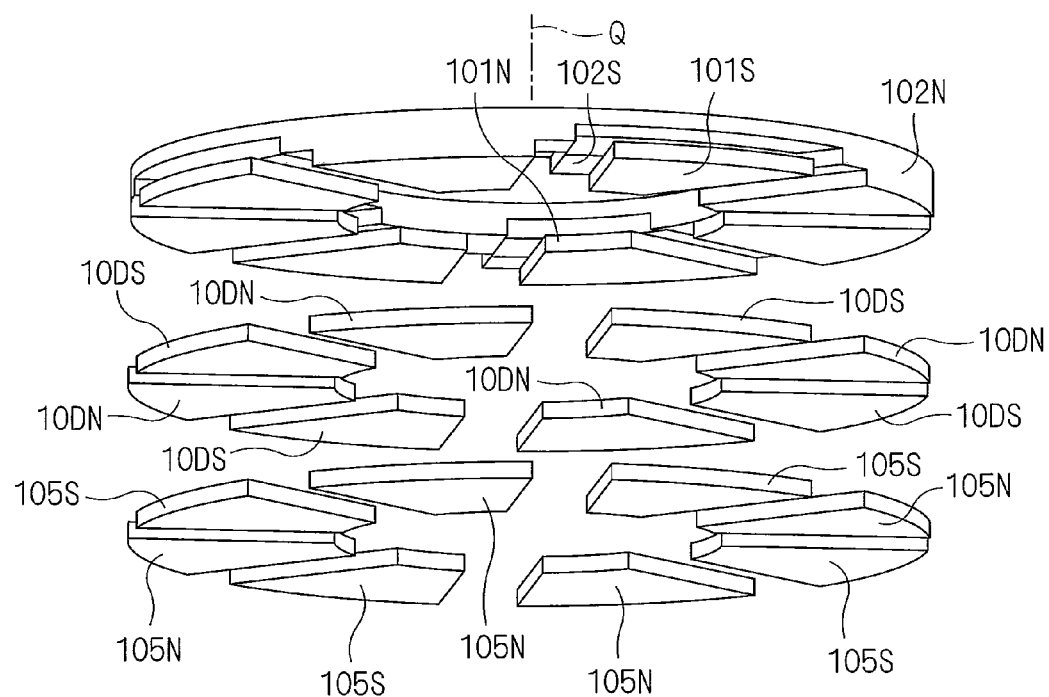

F I G . 4 1
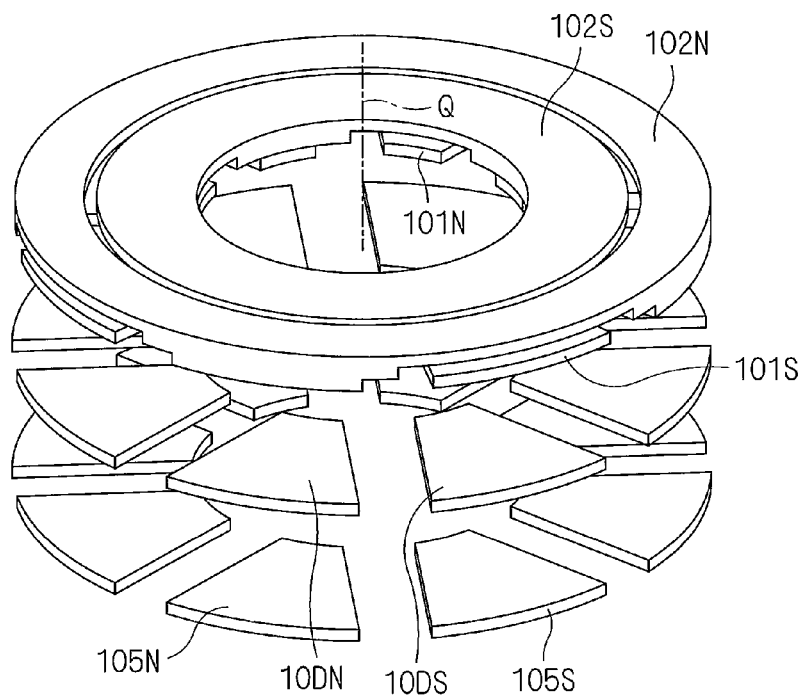
F I G . 4 2
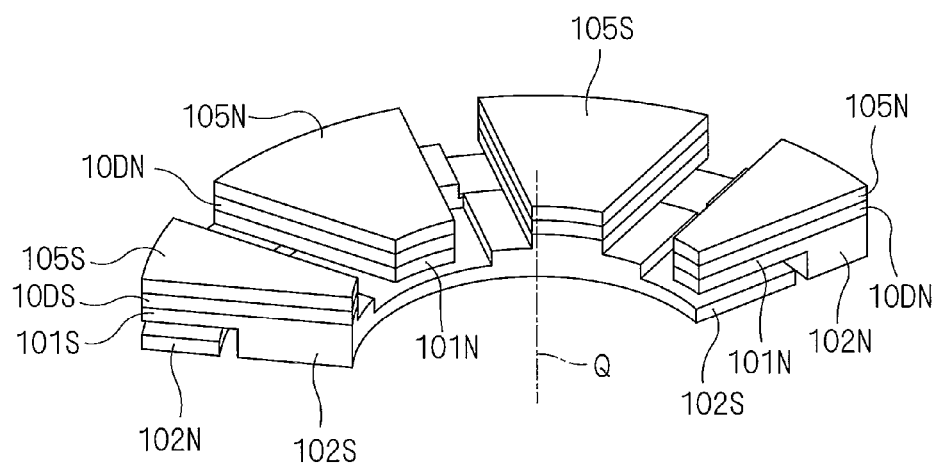

F I G . 4 3
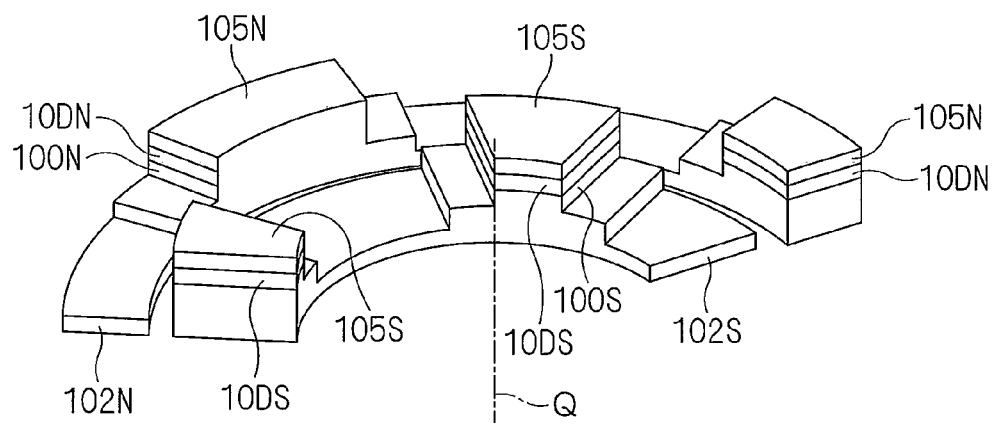

F I G. 47
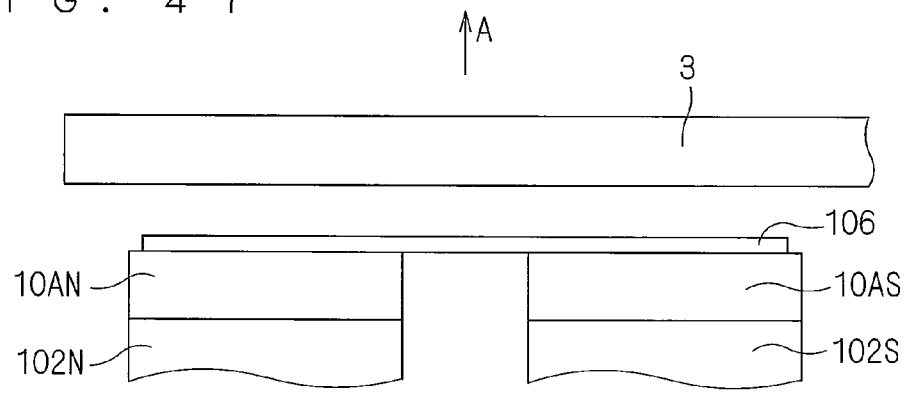
F I G. 48
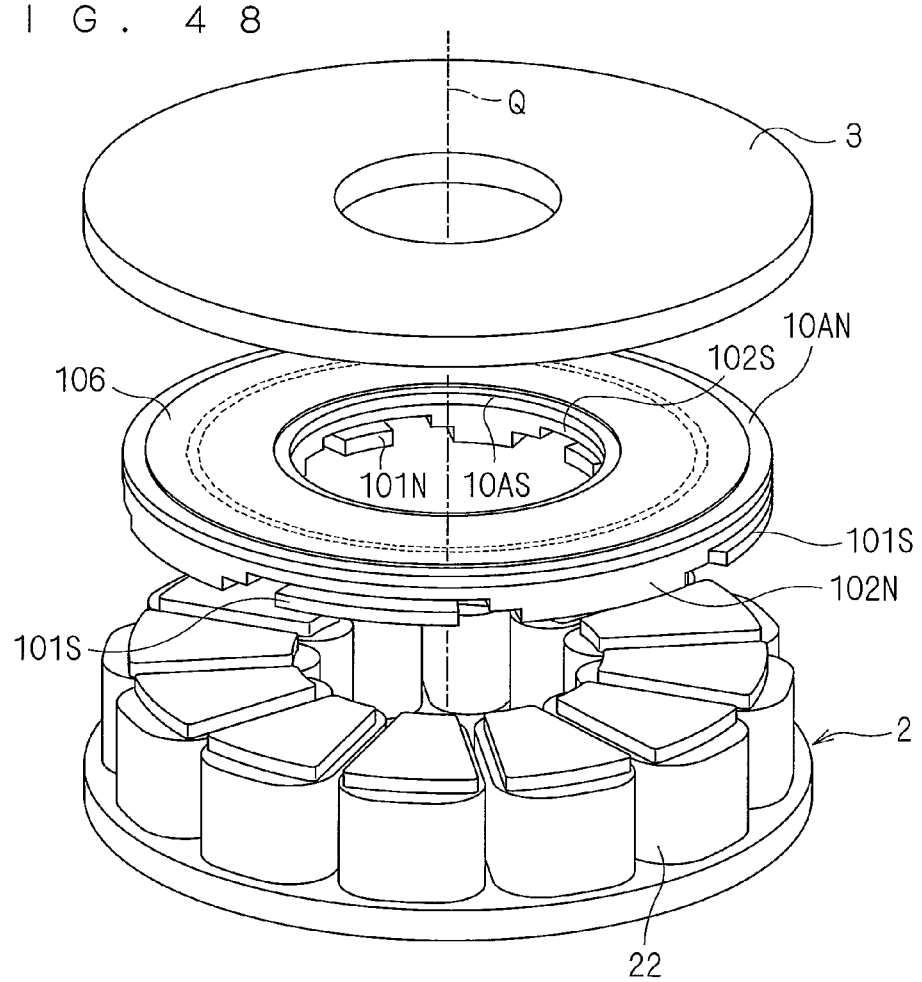

F I G. 4 9
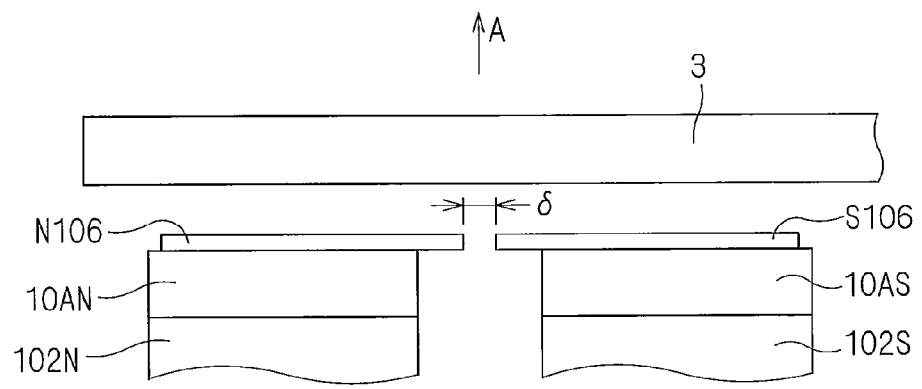
F I G. 5 0
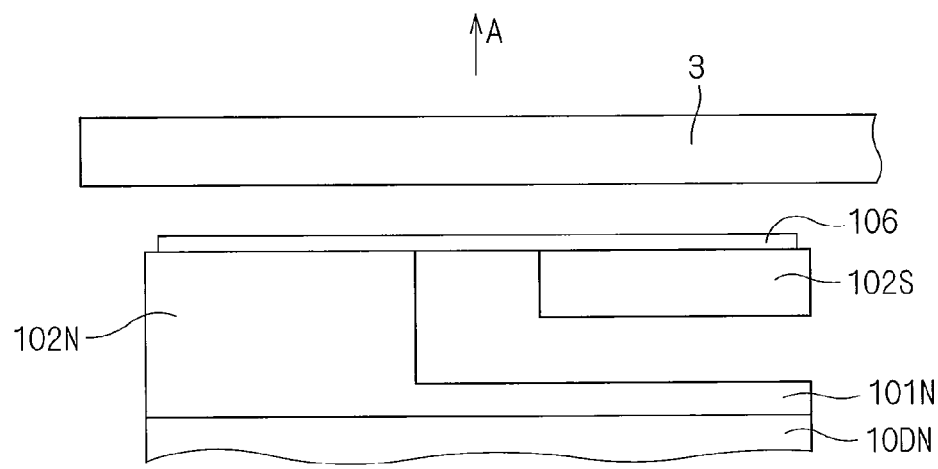

F I G. 5 9
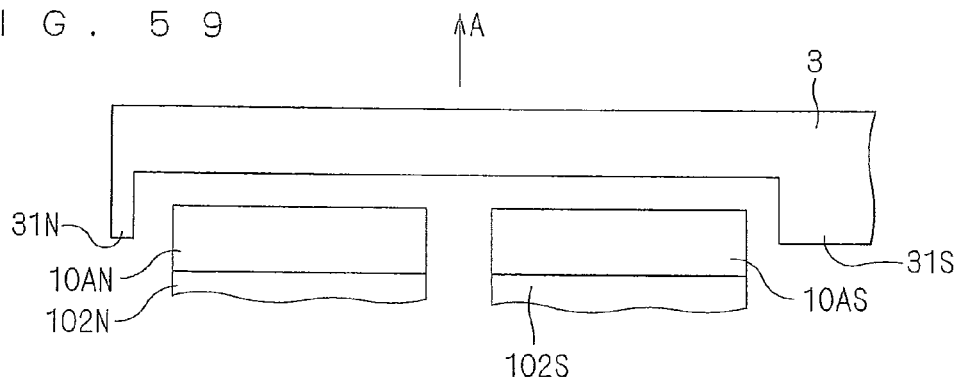
F I G. 6 0
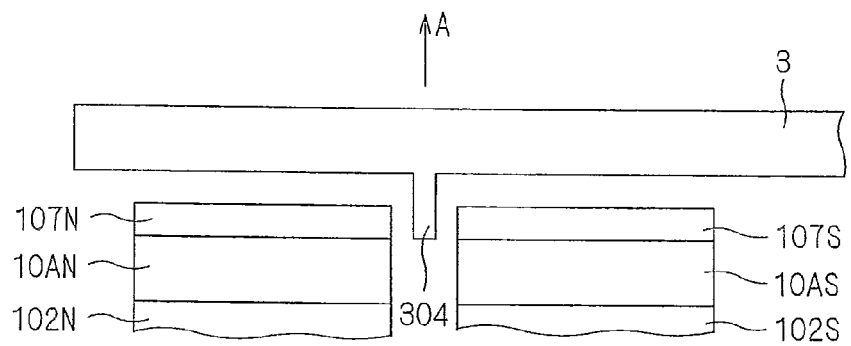
F I G. 6 1
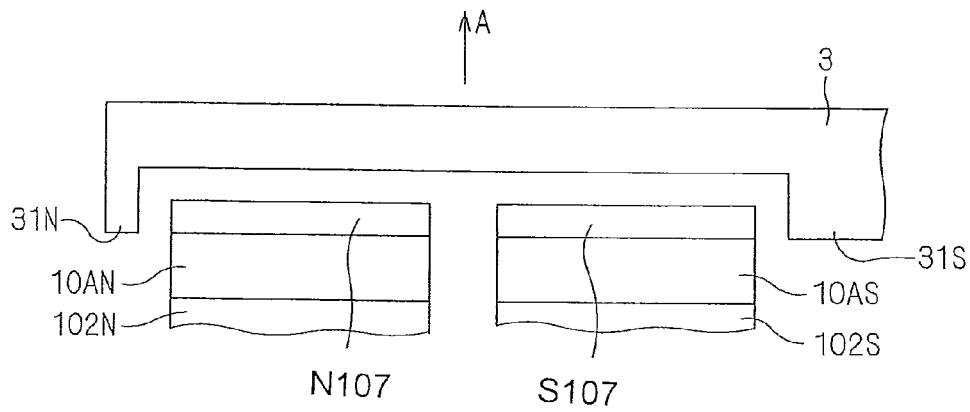

F I G . 6 4
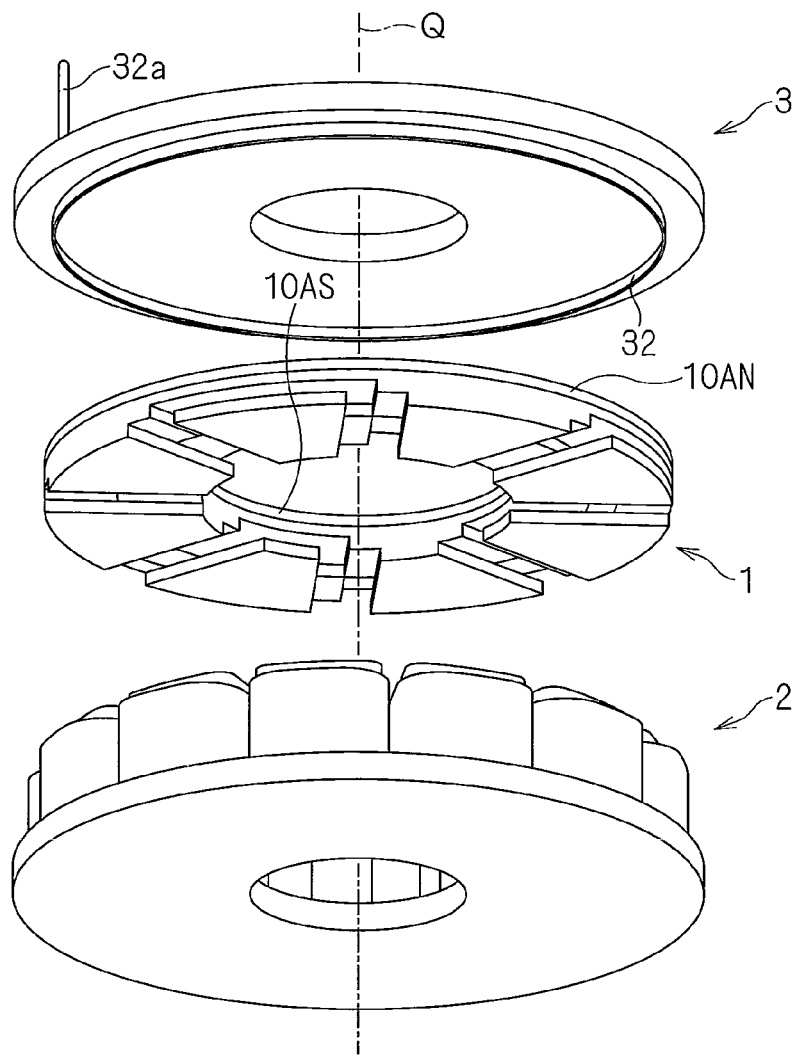
F I G . 6 5
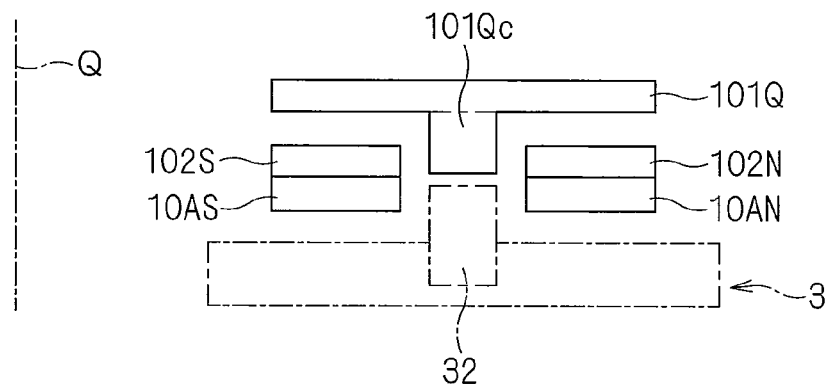

AXIAL GAP ROTARY ELECTRIC MACHINE

TECHNICAL FIELD

The present invention relates to an axial gap rotary electric machine.

BACKGROUND ART

In an axial gap rotary electric machine (hereinafter, merely referred to as "rotary electric machine"), a stator and a rotor are disposed with a gap along a rotation axis. Such a configuration has the following advantages. That is, it is possible to increase a magnetic pole surface of a permanent magnet for generating a magnetic field flux, to increase a space factor of a coil with ease, and to increase torque or output in proportion to a size even when slimming down is aimed in a rotation axis direction.

In the rotary electric machine, an attraction force (referred to as "thrust force" herein) acts between the stator and the rotor along a direction parallel to the rotation axis (referred to as "rotation axis direction" herein). This attraction force incurs problems such as an increase in bearing loss and a reduction in bearing life.

In order to prevent a force acting in a thrust axis direction, the following configurations may be employed in the rotary electric machine. For example, two rotors are provided on both sides of one stator along the rotation axis direction. Alternatively, two stators are provided on both sides of one rotor along the rotation axis direction. A pair of thrust forces in directions opposed to each other are generated along the rotation axis direction in any of the above-mentioned two types of configurations, leading to a reduction in thrust force generated in the rotation axis direction as a whole.

Documents related to the present application are as follows.

Japanese Patent Application Laid-Open No. 2006-353078
Japanese Patent Application Laid-Open No. 61-185040

DISCLOSURE OF INVENTION

Problems to be Solved by the Invention

However, the configuration of the bearing becomes complicated with the configuration in which two rotors are provided. In addition, the rotation axis becomes longer, which causes such a problem that torsional vibrations are easily generated.

Further, armatures are employed for two stators, and accordingly there are two back yokes, where an alternating magnetic field is generated, in the configuration in which two stators are provided. The generation of the alternating magnetic field in the back yoke causes iron loss and, in particular, hysteresis loss, and therefore it is not desired to increase the number of back yokes of an armature.

An object of the present invention is therefore to provide a technology of preventing an increase in the number of back yokes in which an alternating magnetic field is generated while reducing a thrust force by providing stators on both sides along a rotation axis of a rotor. Another object thereof is to reduce an effect of a demagnetizing field acting on a permanent magnet which causes a magnetic field flux.

Means to Solve the Problem

An axial gap rotary electric machine according to the present invention includes: a field element (1) capable of rotating in a circumferential direction about a rotation axis (Q) and generating a magnetic field flux; an armature (2) opposed to the field element from one side in a rotation axis direction parallel to the rotation axis, an armature current flowing through an armature coil (22) interlinked with the magnetic field flux, in which an armature current flows; and a stator (3) being a magnetic body and opposed to the field element from another side in the rotation axis direction.

According to the first aspect, the field element includes: a first magnetic ring (102N) disposed around the rotation axis and supplying the magnetic field flux of a first polarity; a second magnetic ring (102S) disposed on a side closer to the rotation axis (Q) compared with the first magnetic ring and supplying the magnetic field flux of a second polarity; a first magnetic plate (101N) circularly disposed in the circumferential direction so as to be opposed to the armature (2), magnetically separated from the second magnetic ring, and magnetically coupled to the first magnetic ring; and a second magnetic plate (101S) circularly disposed so as to be opposed to the armature with positions thereof in the circumferential direction alternating with the first magnetic plate, magnetically separated from the first magnetic ring and the first magnetic plate, and magnetically coupled to the second magnetic ring.

According to a second aspect of the axial gap rotary electric machine of the present invention, in the first aspect, a side opposite to the rotation axis of the first magnetic plate (101N) is coupled to the first magnetic ring (102N) and extends in a radial direction so as to reach the armature (2) side of the second magnetic ring (102S); and the rotation axis side of the second magnetic plate (101S) is coupled to the second magnetic ring and extends in the radial direction so as to reach the armature side of the first magnetic ring.

A third aspect of the axial gap rotary electric machine of the present invention, in the first or second aspect, further includes: a first magnetic pole surface (10N) supplying the first magnetic ring (102N) with the magnetic field flux of the first polarity; a second magnetic pole surface (10S) supplying the second magnetic ring (102S) with the magnetic field flux of the second polarity; and a permanent magnet (10A) supplying the first magnetic pole surface and the second magnetic pole surface with the magnetic field flux.

According to a fourth aspect of the axial gap rotary electric machine of the present invention, in the third aspect, the permanent magnet (10A) shows at least any one of the first magnetic pole surface (10N) and the second magnetic pole surface (10S).

According to a fifth aspect of the axial gap rotary electric machine of the present invention, in the fourth aspect, the permanent magnet (10A) shows any one of the first magnetic pole surface (10N) and the second magnetic pole surface (10S). The field element (1) further includes a yoke (10Y) magnetically coupled to the permanent magnet (10A) and giving another of the first magnetic pole surface (10N) and the second magnetic pole surface (10S).

According to a sixth aspect of the axial gap rotary electric machine of the present invention, in the fourth aspect, the permanent magnet (10A) includes: a first ring-shaped permanent magnet (10AN) showing the first magnetic pole surface (10N) and generating the magnetic field flux of the first polarity; and a second ring-shaped permanent magnet (10AS) showing the second magnetic pole surface (10S), being disposed on the side closer to the rotation axis (Q) compared with the first ring-shaped permanent magnet, and generating the magnetic field flux of the second polarity. The stator (3) includes a ring-shaped projection (304) inserted between the first ring-shaped permanent magnet and the second ring-shaped permanent magnet in a non-contact manner.

According to a seventh aspect of the axial gap rotary electric machine of the present invention, in the fourth aspect, the permanent magnet (10A) includes: a first ring-shaped permanent magnet (10AN) showing the first magnetic pole surface (10N) and generating the magnetic field flux of the first polarity; and a second ring-shaped permanent magnet (10AS) showing the second magnetic pole surface (10S), being disposed on the side closer to the rotation axis (Q) compared with the first ring-shaped permanent magnet, and generating the magnetic field flux of the second polarity. The field element (1) further includes a third magnetic plate (106) magnetically coupling the first permanent magnet and the second permanent magnet to each other on a side opposite to the first magnetic ring (102N) and the second magnetic ring (102S).

According to an eighth aspect of the axial gap rotary electric machine of the present invention, the field element includes: a plurality of first permanent magnets (10DN) disposed around the rotation axis and supplying the magnetic field flux of a first polarity; a plurality of second permanent magnets (10DS) disposed in the circumferential direction around the rotation axis so as to alternate with the first permanent magnets and supplying the magnetic field flux of a second polarity; a first magnetic plate (105N) circularly disposed in the circumferential direction so as to be opposed to the armature (2), and magnetically coupled to the first permanent magnets; a second magnetic plate (105S) circularly disposed so as to be opposed to the armature with positions thereof in the circumferential direction alternating with the first magnetic plate, magnetically separated from the first magnetic plate, and magnetically coupled to the second permanent magnets; a first magnetic ring (102N) coupling the plurality of first permanent magnets to each other on a side opposite to the first magnetic plate and the second magnetic plate; and a second magnetic ring (102S) coupling the plurality of second permanent magnets to each other on the side opposite to the first magnetic plate and the second magnetic plate.

According to a ninth aspect of the axial gap rotary electric machine of the present invention, in the eighth aspect, the side opposite to the rotation axis of the first magnetic plate (101N) is coupled to the first magnetic ring (102N) and extends in a radial direction so as to reach the armature (2) side of the second magnetic ring (102S); and the rotation axis side of the second magnetic plate (101S) is coupled to the second magnetic ring and extends in the radial direction so as to reach the armature side of the first magnetic ring.

According to a tenth aspect of the axial gap rotary electric machine of the present invention, in the eighth or ninth aspect, the stator (3) includes a ring-shaped projection (304) inserted between the first magnetic ring (102N) and the second magnetic ring (102S) in a non-contact manner.

According to an eleventh aspect of the axial gap rotary electric machine of the present invention, in the eighth or ninth aspect, the field element (1) further includes a third magnetic plate (106) magnetically coupling the first magnetic ring (102N) and the second magnetic ring (102S) to each other on a side opposite to the first permanent magnet (10DN) and the second permanent magnet (10DS).

According to a twelfth aspect of the axial gap rotary electric machine of the present invention, in the fourth aspect, the field element (1) further includes a plurality of magnetic bodies (101Q) circularly disposed so as to be opposed to the armature with positions thereof in the circumferential direction alternating with the first magnetic plate (100N; 101N) and the second magnetic plate (100S, 101S), and magnetically coupled to each other while being magnetically separated from the first magnetic ring (102N) and the second magnetic ring (102S).

According to a thirteenth aspect of the axial gap rotary electric machine of the present invention, in the twelfth aspect, the field element (1) further includes a magnetic ring (101Qa) coupling the plurality of magnetic bodies (101Q) to each other in the circumferential direction on the side opposite to the rotation axis (Q).

According to a fourteenth aspect of the axial gap rotary electric machine of the present invention, in the twelfth aspect, the field element (1) further includes a magnetic ring (101Qc) coupling the plurality of magnetic bodies (101Q) to each other in the circumferential direction between the first magnetic ring (102N) and the second magnetic ring (102S).

According to a fifteenth aspect of the axial gap rotary electric machine of the present invention, in the twelfth aspect, the field element (1) further includes a magnetic ring (101Qb) coupling the plurality of magnetic bodies (101Q) to each other in the circumferential direction on the side of the rotation axis (Q).

According to a sixteenth aspect of the axial gap rotary electric machine of the present invention, in the twelfth aspect, the stator (3) further includes a projection (30Q) being in proximity to the plurality of magnetic bodies (101Q).

According to a seventeenth aspect of the axial gap rotary electric machine of the present invention, in any of the first to sixteenth aspects, the stator (3) includes a magnetic field coil (32) wound in the circumferential direction, for generating the magnetic field flux. A position of the magnetic field coil in the radial direction is located between the first magnetic ring (102N) and the second magnetic ring (102S).

EFFECTS OF THE INVENTION

According to the first, second, eighth and ninth aspects of the axial gap rotary electric machine of the present invention, the first magnetic plate and the second magnetic plate are provided, which is resistant to demagnetization by the magnetic field generated from the armature, and cancels a thrust force along the rotation axis direction.

According to the third and fourth aspects of the axial gap rotary electric machine of the present invention, the source of the magnetic field flux is obtained with ease.

According to the fifth aspect of the axial gap rotary electric machine of the present invention, it is possible to reduce the number of magnets.

According to the sixth aspect of the axial gap rotary electric machine of the present invention, control is made so as to reduce the thrust force.

According to the seventh aspect of the axial gap rotary electric machine of the present invention, it is possible to adjust the thrust force.

According to the tenth aspect of the axial gap rotary electric machine of the present invention, control is made so as to reduce the thrust force.

According to the eleventh aspect of the axial gap rotary electric machine of the present invention, it is possible to adjust the thrust force.

According to the twelfth to sixteenth aspects of the axial gap rotary electric machine of the present invention, an inductance in a so-called q-axis direction is increased, whereby reluctance torque is easily obtained.

In particular, according to the fifteenth aspect, there is an advantage in that a magnetic path for coupling the magnetic bodies to each other is short.

Further, according to the sixteenth aspect, there is no need to provide the configuration for coupling the magnetic bodies to each other in the rotor, with the result that an attraction force acting between the armature and the rotor in the rotation axis direction is reduced.

According to the seventeenth aspect of the axial gap rotary electric machine of the present invention, adjustment of the magnetic field flux is facilitated by adjusting a current caused to flow through the magnetic field coil. When it is used as a motor, it is possible to perform a high-speed operation by performing field weakening or increase the magnetic field flux for increasing torque at low-speed operation. This means that a high-speed operation and a low-speed operation with high efficiency are made compatible with each other, which is particularly suitable for an on-vehicle motor. Alternatively, when it is used as a generator, it is possible to generate required voltage irrespective of the number of revolutions by adjusting the magnetic field flux in accordance with fluctuations of the number of revolutions, which is particularly suitable for an on-vehicle alternator. Still alternatively, when it is used as a train motor, it is possible to reduce the magnetic field flux in a coasting operation in which relatively long driving is performed.

The object, features, aspects, and advantages of the present invention will be more apparent from the following detailed description in conjunction with the attached drawings.

BRIEF DESCRIPTION OF DRAWINGS

FIG. 3 is a cross-sectional view showing a cross-section of an armature at a position III-III of FIG. 2;

FIG. 4 is a cross-sectional view showing a cross-section of the armature along a circumferential direction;

FIG. 20 is a perspective view showing a fourth modification of the rotor;

FIGS. 21 to 23 are perspective views showing a fifth modification of the rotor;

FIG. 24 is a perspective view showing a sixth modification of the rotor;

FIG. 27 is a perspective view showing an eighth modification of the rotor;

FIG. 30 is a cross-sectional view showing a cross-section at a position XXX-XXX of FIG. 29;

FIG. 31 is a cross-sectional view showing a cross-section at a position XXXI-XXXI of FIG. 29;

FIG. 32 is a cross-sectional view showing a cross-section at a position XXXII-XXXII of FIG. 29;

FIG. 33 is a cross-sectional view showing a cross-section at a position XXXIII-XXXIII of FIG. 29;

FIG. 37 is a perspective view showing a configuration of a rotary electric machine according to a third embodiment of the present invention;

FIGS. 40 and 41 are perspective views showing a configuration of a rotary electric machine according to a fifth embodiment of the present invention;

FIGS. 42 and 43 are cross-sectional views showing the configuration of the rotary electric machine according to the fifth embodiment of the present invention;

FIGS. 44 to 47 are cross-sectional views partially showing the rotor and the stator;

FIG. 48 is a perspective view showing a configuration of a rotary electric machine according to a seventh embodiment of the present invention;

FIGS. 49 to 57 are cross-sectional views partially showing the rotor and the stator;

FIGS. 59 to 63 are cross-sectional views partially showing the rotor and the stator;

FIG. 64 is a perspective view showing a configuration of a rotary electric machine according to a ninth embodiment of the present invention;

FIG. 65 is a cross-sectional view showing a cross-section of the rotary electric machine according to the ninth embodiment of the present invention.

BEST MODE FOR CARRYING OUT THE INVENTION

First Embodiment

Figure 1:
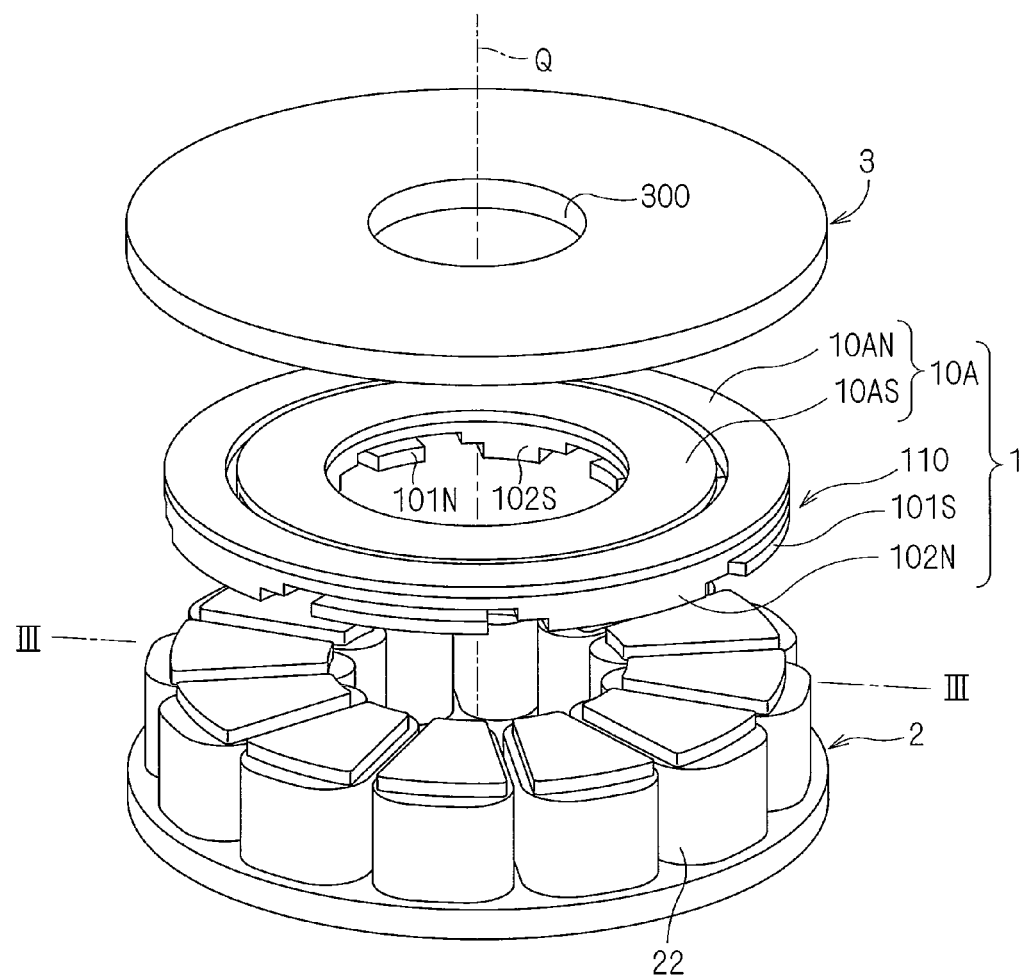
FIGS. 1 and 2 are perspective views showing a configuration of a rotary electric machine according to a first embodiment of the present invention.

FIG. 1 is a perspective view showing a configuration of a rotary electric machine according to a first embodiment of the present invention. The rotary electric machine includes a rotor 1 which is a field element, an armature 2 and a stator 3.

The rotor 1 is rotatable in a circumferential direction about a rotation axis Q. FIG. 1 is a perspective view which is viewed from the stator 3 side with a tilt with respect to the rotation axis Q. For clarification of the configuration, intervals (commonly referred to as "air gaps") between ones of the rotor 1, the armature 2 and the stator 3 along the rotation axis Q are highlighted.

The armature 2 is opposed to the rotor 1 from one side (lower side in FIG. 1) in the rotation axis direction. The rotor 1 includes a rotor core 110 and a permanent magnet 10A. The permanent magnet 10A is provided on a side opposite to the rotor core 110 with respect to the armature 2, and causes a magnetic field flux to flow through the rotor core 110.

Figure 2:
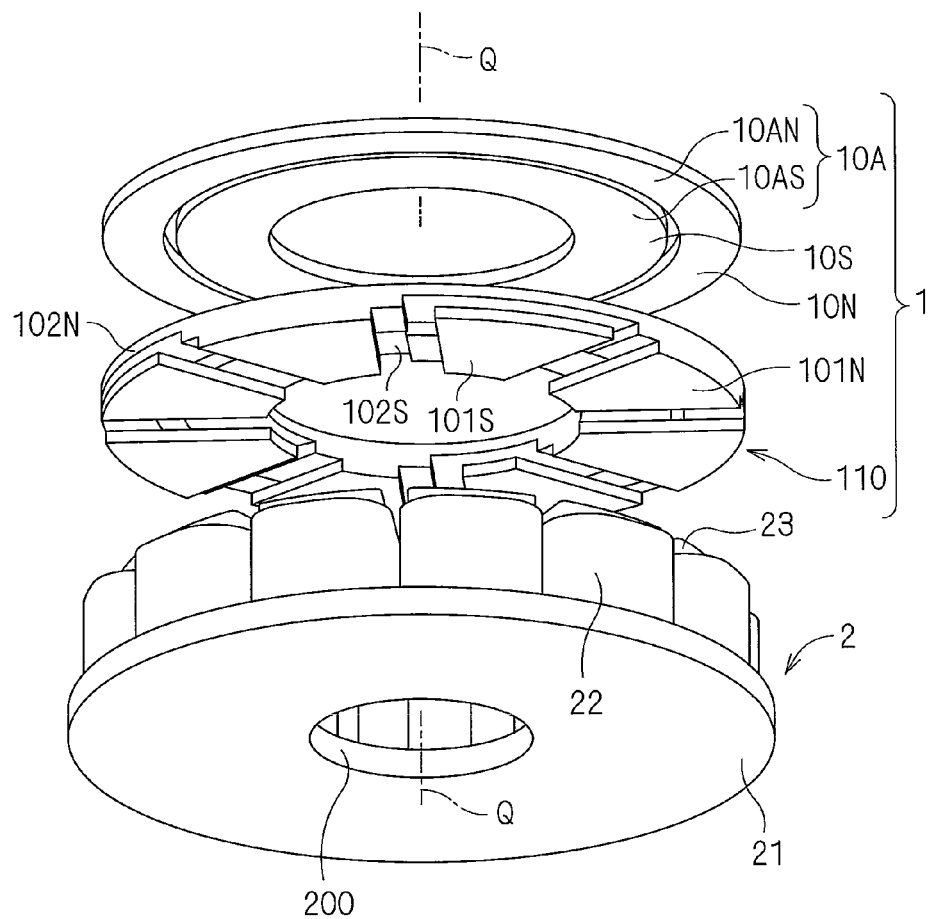

FIG. 2 is a perspective view which is viewed from the armature 2 side with a tilt with respect to the rotation axis Q. However, the stator 3 is not shown, and the rotor core 110 and the permanent magnet 10A are separated along the rotation axis Q to be shown. Note that drawings of the rotor core 110 show only a magnetic body unless otherwise noted, and structural members for holding the magnetic body are omitted.

With reference to FIG. 2, the permanent magnet 10A includes a magnetic pole surface 10N for supplying the rotor core 110 with the magnetic field flux of the first polarity (for example, N pole), and a magnetic pole surface 10S for supplying the rotor core 110 with the magnetic field flux of the second polarity (for example, S pole). Here, there is illustrated a case in which the magnetic pole surface 10S is disposed on a side closer to the rotation axis Q compared with the magnetic pole surface 10N.

Here, there is further illustrated a case in which the permanent magnet 10A is composed of permanent magnets 10AN and 10AS. A magnetic pole surface of the permanent magnet 10AN on the rotor core 110 side shows a magnetic pole surface 10N, and a magnetic pole surface of the permanent magnet 10AS on the rotor core 110 side shows a magnetic pole surface 10S.

The armature 2 includes a yoke 21, teeth 23 and an armature coil 22. FIG. 3 is a cross-sectional view showing a cross-section of the armature 2 at a position of FIG. 1, which includes the rotation axis Q and is parallel thereto. Further, FIG. 4 is a cross-sectional view showing a cross-section of the armature 2 in a vicinity of the center of the teeth 23 in a radial direction. Those cross-sections are along the circumferential direction. In FIG. 3 and FIG. 4, the teeth 23 are widened on the air gap side. This is for transferring the magnetic flux of the rotor as much as possible to the armature. This configuration is not necessarily required.

The teeth 23 are provided to the yoke 21 on the rotor 1 side, and are circularly disposed around the rotation axis Q. The armature coil 22 is wound around the teeth 23. Therefore, the armature coil 22 is circularly disposed around the rotation axis Q as well. Here, the armature coil 22 shows so-called concentrated winding in which the armature coil 22 is wound around each of the teeth 23, but the armature coil 22 may be wound by distributed winding. That is, the armature 2 is capable of adopting an armature (wound stator) of a publicly-known motor.

Note that unless particularly noted in the present application, the armature coil 22 refers to a mode in which wires are wound as a whole, not to each wire constituting this. This holds true for the drawings as well. Leading lines in start and end of winding and wire connection thereof are also omitted in the drawings.

Further, a yoke and a core refer to a magnetic yoke and a magnetic core, respectively, unless particularly noted in the present application.

The armature 2 typically functions as a stator with the yoke 21 fixed to an outside thereof. The yoke 21 is formed of, for example, an electromagnetic steel plate in which one long electromagnetic steel plate is wound and layered into a hoop shape in parallel to the rotation axis direction (hereinafter referred to as "wound core"), electromagnetic steel plates laminated in the circumferential direction, electromagnetic steel plates laminated in the rotation axis direction, or a dust core. In the case where the yoke 21 is formed of the electromagnetic steel plates laminated in the rotation axis direction or the dust core, it may be divided into a plurality of pieces in the circumferential direction.

Alternatively, the yoke 21 may double as a part of a mechanism to which the rotary electric machine is applied. For example, in a case where the rotary electric machine is applied to a compressor as a motor, the yoke 21 may function as a part of a frame of the compressor. The armature 2 is provided with a through hole 200 for causing a rotation shaft (not shown) provided in the rotor 1 to penetrate therethrough.

The stator 3 is a magnetic member which is opposed to the rotor 1 from the other side (upper side in FIG. 1) in the rotation axis direction. The stator 3 is provided with a hole 300 for causing the rotation shaft (not shown) provided in the rotor 1 to penetrate therethrough.

The armature 2 (which also functions as a stator) and the stator 3 are provided on both sides of the rotor 1 in this manner, and thus a thrust force along the rotation axis direction is canceled. In addition, the stator 3 is a magnetic member, whereby the alternating magnetic flux does not flow therethrough. Therefore, compared with a case where two armatures are provided, iron loss in the armature decreases as a whole.

Figure 5:
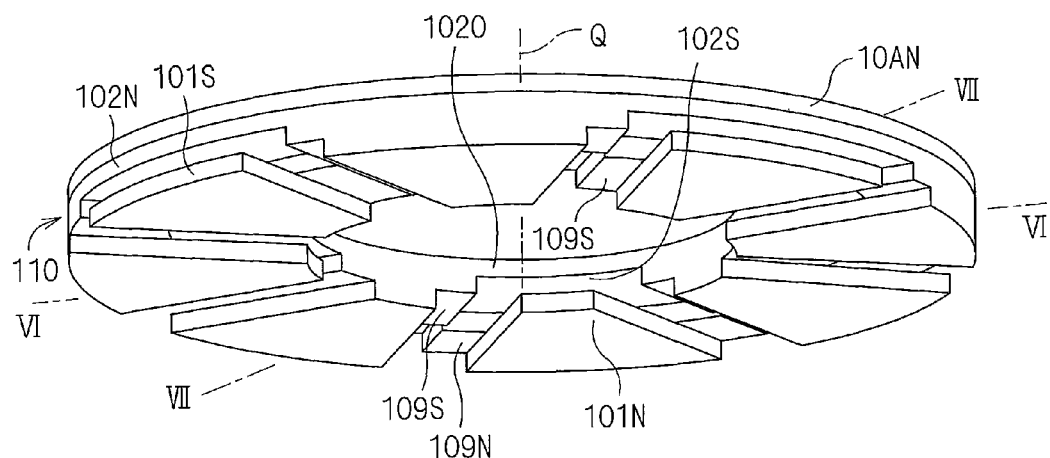
FIG. 5 is a perspective view showing a configuration of a rotor.
Figure 6:
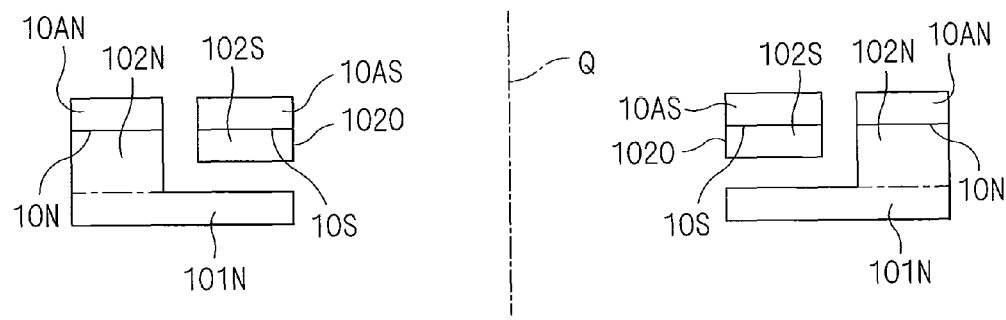
FIG. 6 is a cross-sectional view showing a cross-section of the rotor at a position VI-VI of FIG. 5.
Figure 7:
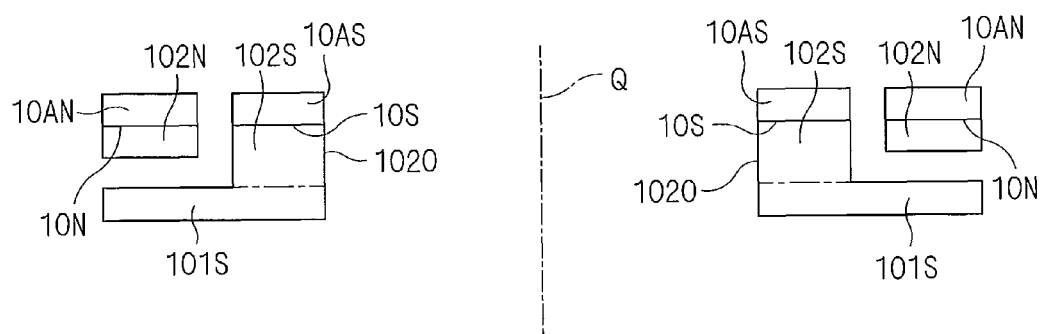
FIG. 7 is a cross-sectional view showing a cross-section of the rotor at a position of FIG. 5.

FIG. 5 is a perspective view showing the configuration of the rotor 1. FIG. 6 and FIG. 7 are cross-sectional views showing cross-sections of the rotor 1 at a position VI-VI and a position VII-VII of FIG. 5, respectively. FIG. 6 and FIG. 7 each show the cross-section which includes the rotation axis Q and is parallel thereto.

The rotor core 110 includes magnetic plates 101N and 101S and magnetic rings 102N and 102S. The magnetic ring 102S is disposed on a side closer to the rotation axis Q compared with the magnetic ring 102N. The magnetic rings 102N and 102S are supplied with the magnetic field flux from the magnetic pole surfaces 10N and 10S, respectively. An inner circumferential surface 1020 of the magnetic ring 102S is fixed by a holding member formed of a non-magnetic body, which is provided with a hole for causing the rotation shaft (not shown) to penetrate therethrough to be fixed.

The magnetic plates 101N and 101S are disposed so as to be opposed to the armature 2. The magnetic plates 101N and the magnetic plates 101S are circularly disposed in the circumferential direction so that positions thereof in the circumferential direction alternate with each other. The magnetic plate 101N is magnetically separated from the magnetic ring 102S and is magnetically coupled to the magnetic ring 102N. The magnetic plate 101S is magnetically separated from the magnetic ring 102N and is magnetically coupled to the magnetic ring 102S.

A large area is taken for the magnetic pole surface of the rotor 1, and thus the magnetic plates 101N and 101S occupy positions substantially equal to each other in the radial direction. Specifically, an outer circumferential side of the magnetic plate 101N is coupled to the magnetic ring 102N. In addition, the magnetic plate 101N extends in the radial direction so that an inner circumferential side thereof reaches the armature 2 side of the magnetic ring 102S. In the similar manner, an inner circumferential side of the magnetic plate 101S is coupled to the magnetic ring 102S. In addition, the magnetic plate 101S extends in the radial direction so that an outer circumferential side thereof reaches the armature 2 side of the magnetic ring 102N.

In order to achieve a balance of the magnetic field flux, a distance between the magnetic plate 101N and the armature 2 and a distance between the magnetic plate 101S and the armature 2 in the rotation axis direction are desirably selected to be equal to each other.

In order to prevent the situation in which the magnetic field flux flows in the rotor 1 in a short-circuit manner, which prevents internlinkage of the armature 2 with the armature coil 22, the following point is to be noted in terms of a size. That is, a distance between the magnetic plate 101S and the magnetic ring 102N in the rotation axis direction and a distance between the magnetic plate 101N and the magnetic ring 102S in the rotation axis direction are each twice as large as the distances between the magnetic plates 101N and 101S and the armature 2. In other words, the distances between the magnetic plates 101N and 101S and the armature 2, which are highlighted in FIG. 1 and FIG. 2, are in actuality, each less than a half of the distance between the magnetic plate 101S and the magnetic ring 102N in the rotation axis direction and the distance between the magnetic plate 101N and the magnetic ring 102S in the rotation axis direction, respectively.

The rotor 1 is configured as described above, and accordingly the number of magnetic poles of the rotor 1 is increased more easily while obtaining the source of the magnetic field flux with a simple configuration. More specifically, though it is only required to increase the number of the magnetic plates 101N and 101S for increasing the number of magnetic poles of the rotor 1, the number of the magnetic rings 102N and 102S are not required to be increased for such modification.

Further, there are minor changes in magnetic flux of the magnetic pole surfaces 10N and 10S and the magnetic rings 102N and 102S even when the rotor 1 rotates. Accordingly, iron loss in the rotary electric machine is not increased remarkably.

When the permanent magnet 10A is employed, the source of the magnetic field flux is achieved with a simple configuration or, in this case, by the permanent magnets 10AN and 10AS having a ring shape. The respective permanent magnets 10AN and 10AS are only required to be magnetized in the rotation axis direction with the same polarity irrespective of the position in the circumferential direction even when the number of the magnetic plates 101N and 101S are increased for increasing the number of magnetic poles of the rotor 1. Accordingly, magnetization is facilitated. Moreover, there is no occurrence of leakage flux between magnetic poles of opposite polarities which are adjacent to each other in the same permanent magnet, nor insufficient magnetization in a vicinity of a boundary between magnetic poles.

Further, the magnetic pole surfaces 10N and 10S of the permanent magnets 10AN and 10AS are designed to be large to increase the magnetic field flux with more ease. However, areas of the magnetic pole surfaces 10N and 10S are desirably made equal to each other in terms of a balance of the magnetic field flux. Specifically, assuming that the magnetic pole surfaces 10N and 10S both have an annular shape, a width in the radial direction on a side positioned on an outer circumference is made to be smaller than that on a side positioned on an inner circumference.

Note that the distance between the magnetic pole surfaces 10N and 10S is desirably twice as large as a sum of an air gap between the rotor 1 and the armature 2 and an air gap between the rotor 1 and the stator 3. This is because the magnetic field flux makes one shuttle, between the magnetic pole surfaces 10N and 10S, in those air gaps, and thus the magnetic field flux does not flow in a short-circuit manner between the magnetic pole surfaces 10N and 10S inside the rotor 1.

The alternating magnetic flux does not flow in the stator 3 as described above, and accordingly iron loss is not increased. In addition, the rotor core 110 is provided between the permanent magnet 10A and the armature 2. Therefore, though the permanent magnet 10A is employed for the source of the magnetic field flux, the permanent magnet 10A is difficult to be affected by the magnetic field generated by the armature 2. That is, the above-mentioned configuration has an advantage that it is resistant to demagnetization in terms of configuration.

Thanks to the structural advantages as described above, degree of freedom in selecting a material for the permanent magnet 10A is increased. This is because it is not required to select from materials having high magnetic coercive force. Therefore, it is possible to select a material having high remanent magnetic flux density as a material for the permanent magnet 10A without considering such request. Alternatively, there may be employed an inexpensive ferrite magnet or a bonded magnet whose shape is designed freely.

With reference to FIG. 5, a part of the magnetic ring 102N, which is coupled to the magnetic plate 101N, extends in the rotation axis direction. Therefore, the magnetic ring 102N is thick at a position where the magnetic plate 101N is provided, and is thin at a position where the magnetic plate 101S is provided, which accordingly generates a step 109N. In a similar manner, a step 109S is generated in the magnetic ring 102S. The steps 109N and 109S are desirably moderated for smooth flow of the magnetic field flux. In addition, the magnetic rings 102N and 102S are easily saturated, and thus may be made longer in the radial direction to reduce saturation compared with other parts of the rotor.

Further, it is not necessarily required that the inner circumferential side extends in the radial direction so as to reach the armature 2 side of the magnetic ring 102S as in the case of the magnetic plate 101N, nor that the outer circumferential side extends in the radial direction so as to reach the armature 2 side of the magnetic ring 102N as in the case of the magnetic plate 101S. Parts of the magnetic rings 102N and 102S, which project at selected positions in the circumferential direction, may function as the magnetic plate while keeping the thicknesses thereof almost constant.

Figure 8:
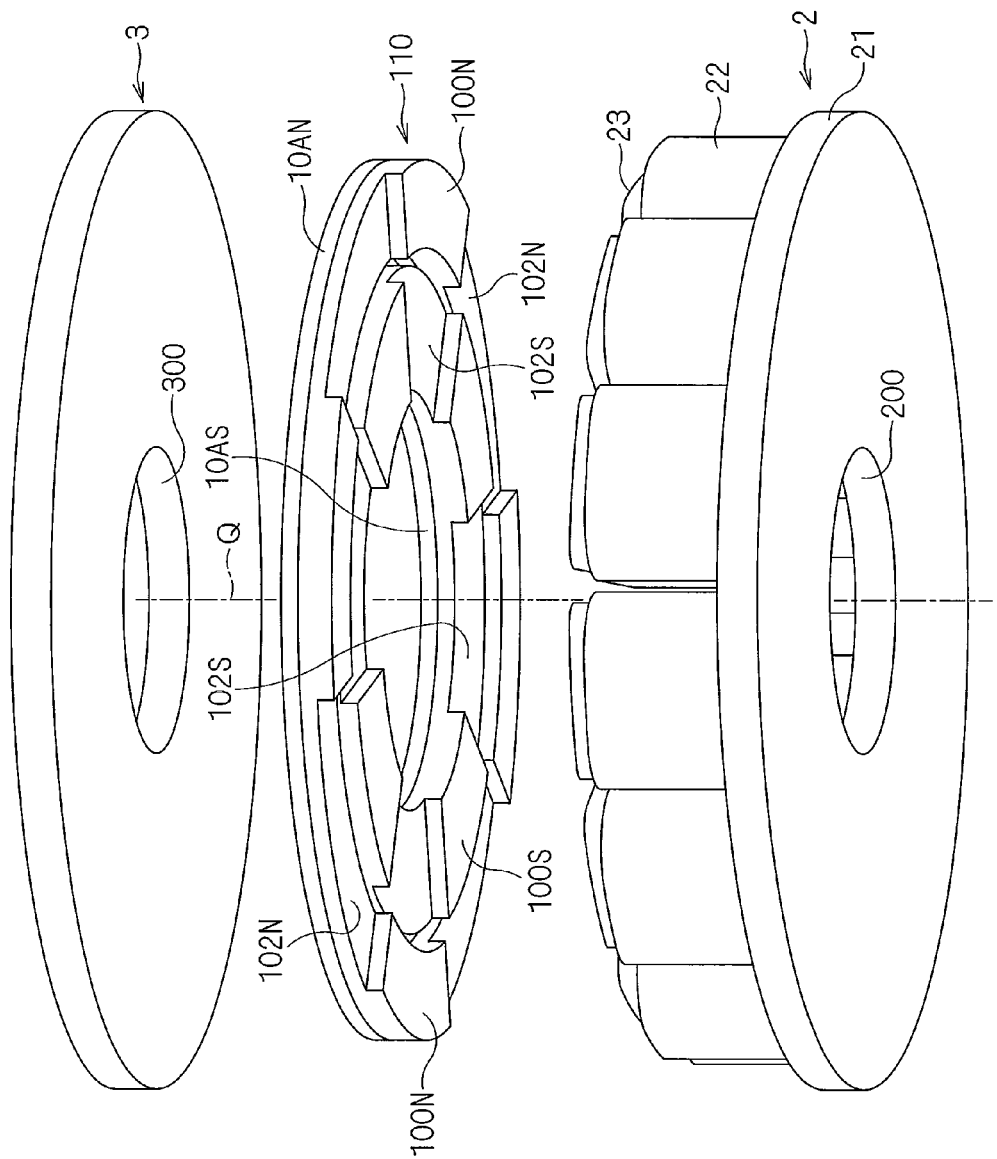
FIG. 8 is another perspective view showing the configuration of the rotary electric machine according to the first embodiment of the present invention.

FIG. 8 is a perspective view corresponding to FIG. 1, which shows a configuration in which the magnetic plates 101N and 101S are replaced with magnetic plates 100N and 100S, respectively. The magnetic plates 100N and 100S occupy the same positions as those of the magnetic rings 102N and 102S in the radial direction, respectively, and project toward the armature 2 side to be opposed to each other. Further, the magnetic plates 100N and the magnetic plates 100S are circularly disposed so that positions thereof in the circumferential direction alternate with each other.

Figure 9:
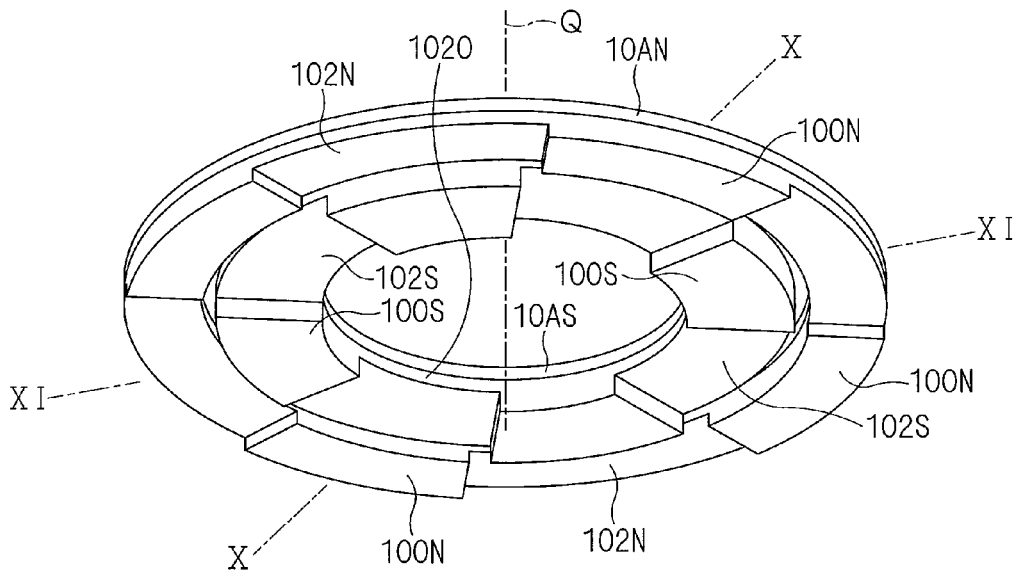
FIG. 9 is another perspective view showing the configuration of the rotor.
Figure 10:
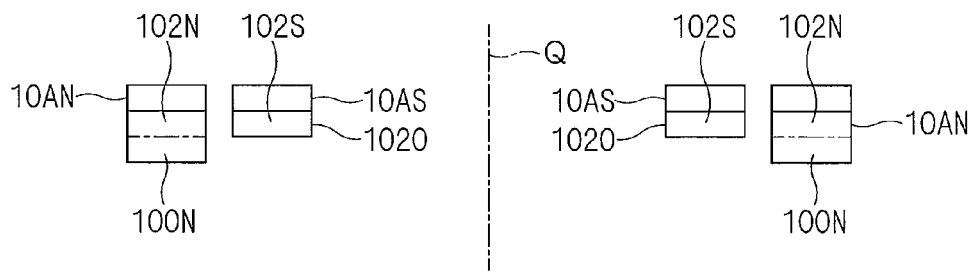
FIG. 10 is a cross-sectional view showing a cross-section of the rotor at a position X-X of FIG. 9.
Figure 11:
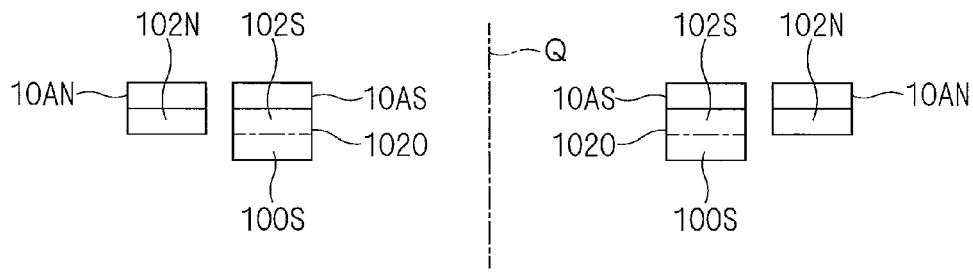
FIG. 11 is a cross-sectional view showing a cross-section of the rotor at a position XI-XI of FIG. 9.

FIG. 9 corresponds to FIG. 5, which is a perspective view showing the configuration of the rotor 1. FIG. 10 and FIG. 11 are cross-sectional views showing cross-sections of the rotor 1 at a position X-X and a position XI-XI of FIG. 9, respectively. FIG. 10 and FIG. 11 each show the cross-section including the rotation axis Q and is parallel thereto.

In respective embodiments and modifications described below, description will be given of, as an example, the case where the magnetic plates 101N and 101S are used unless particularly noted. However, the magnetic plates 101N and 101S may be replaced with the magnetic plates 100N and 100S unless functions of the respective embodiments and modifications are not impeded.

Figure 12:
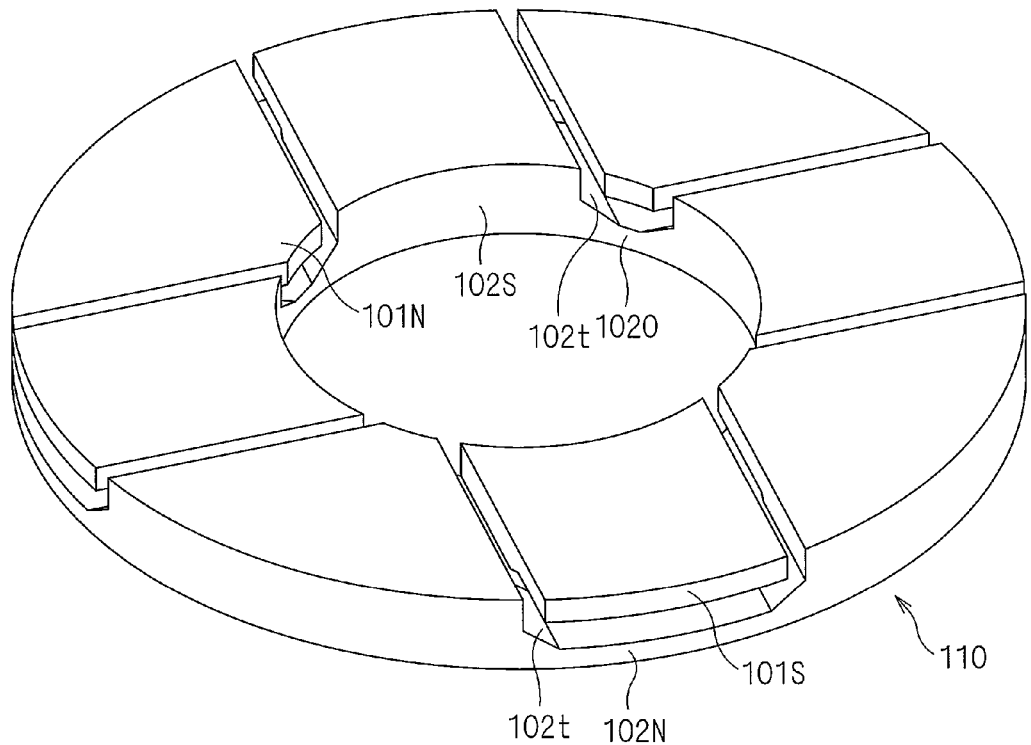
FIG. 12 is a perspective view showing another shape of the rotor.

FIG. 12 is a perspective view showing other shape of the rotor core 110. In the shape shown in FIG. 12, the above-mentioned steps have a shape of a taper 102t, and thus more smooth flow of the magnetic field flux is expected compared with the step-wise shape as shown in FIG. 5. Further, a boundary between the magnetic plates 101N and 101S is inclined with respect to a line in the radial direction, which passes through the center of rotation, and accordingly there is achieved a so-called skew effect to be expected to reduce cogging torque or the like.

In the rotor core 1, the magnetic field flux has components not only in the rotation axis direction but also in the radial direction and the circumferential direction. In addition, iron loss in the rotor core 110 is mainly eddy-current loss with little hysteresis loss. Therefore, the rotor core 110 is desirably formed of a dust core.

Second Embodiment

In the present embodiment, a desirable modification of the rotor core 110 will be described. Desirably, the magnetic plates 101N and 101S are structurally coupled to each other while being magnetically separated from each other. Alternatively, it is desirable that the magnetic rings 102N and 102S be structurally coupled to each other while being magnetically separated from each other.

Figure 13:
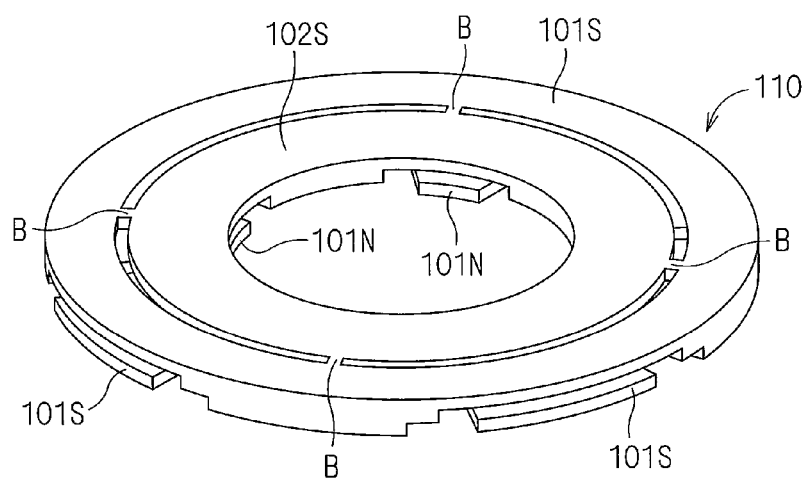
FIG. 13 is a perspective showing a first modification of the rotor.

FIG. 13 is a perspective view showing a first modification of the rotor core 110, which shows a configuration in which bridges B are additionally provided to the rotor core 110 shown in FIG. 5. The bridge B couples the magnetic rings 102N and 102S to each other on a side opposite to the magnetic plates 101N and 101S (permanent magnet 10A side, see FIG. 2). Such a configuration is obtained with ease by forming the magnetic rings 102N and 102S and the magnetic plates 101N and 101S of a dust core.

Note that the bridge B is essentially formed to be thin to an extent that it is magnetically saturated with ease so as not to magnetically short-circuit the magnetic rings 102N and 102S. This is because the magnetically saturated bridge B essentially functions as a magnetic barrier.

Figure 14:
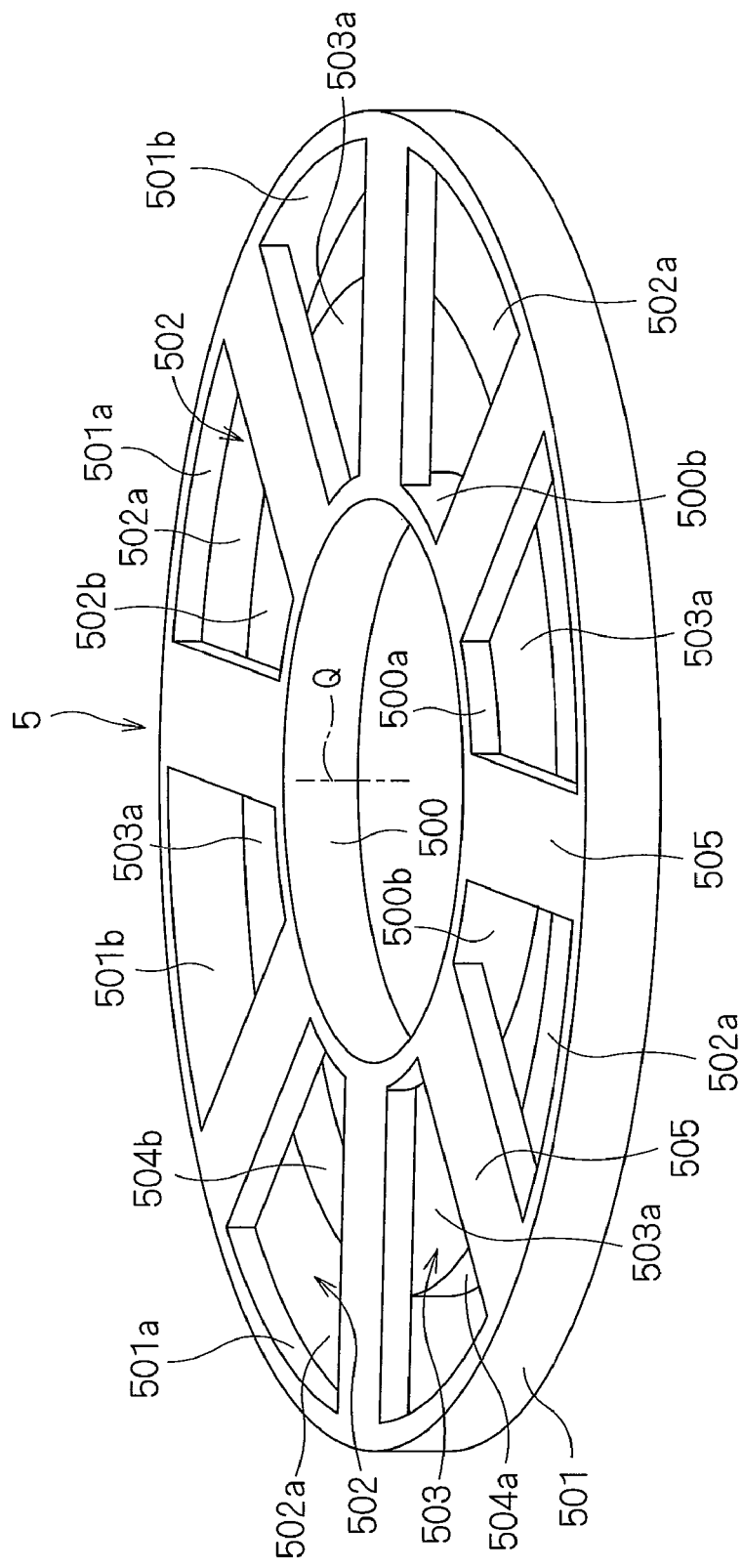
FIGS. 14 and 15 are perspective views showing a second modification of the rotor.
Figure 15:
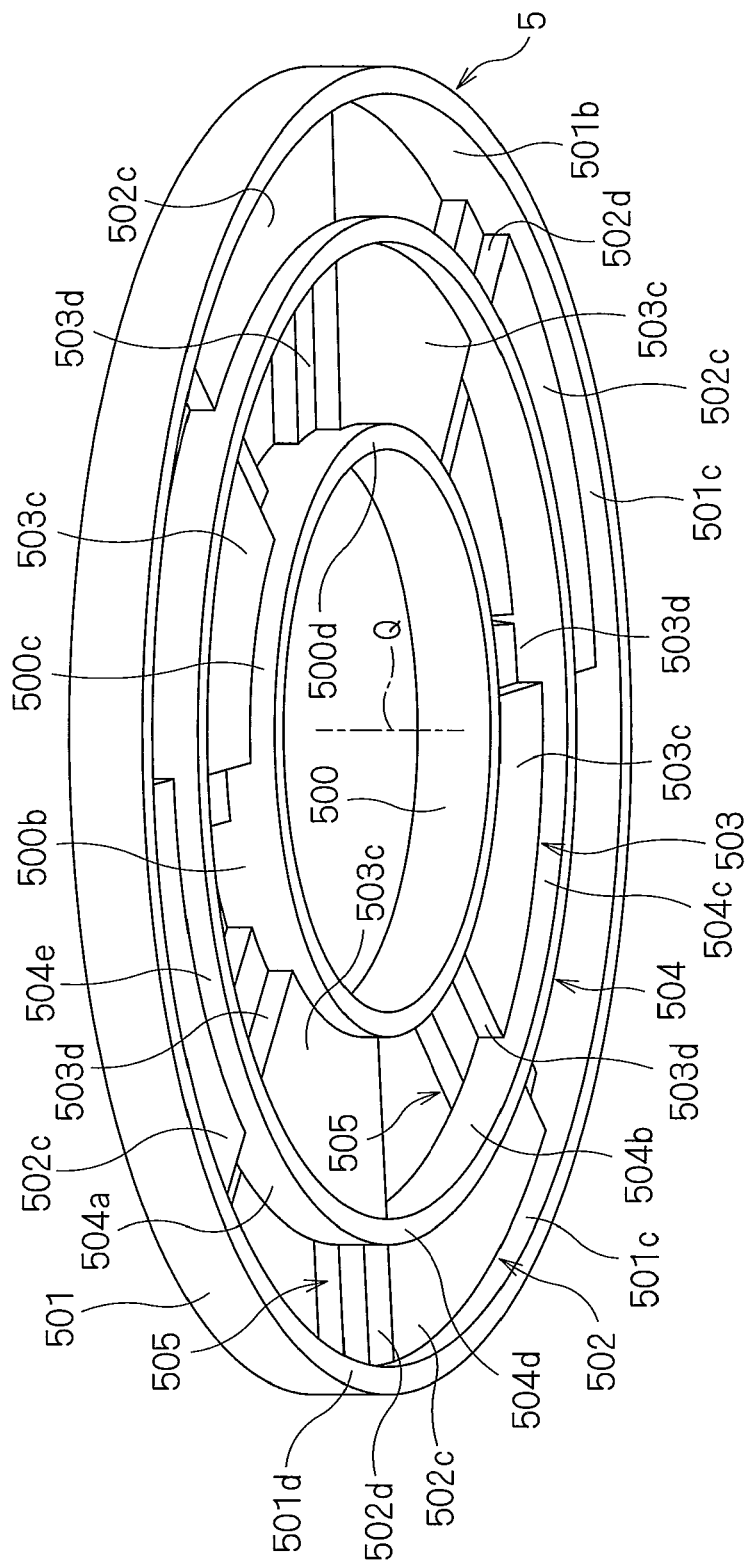

FIG. 14 and FIG. 15 are perspective views showing a second modification of the rotor core 110, which show a configuration of a holder 5 which holds the magnetic plates 101N and 101S and the magnetic rings 102N and 102S. FIG. 14 is the perspective view which is viewed with a tilt with respect to the rotation axis Q from the side on which the magnetic plates 101N and 101S are held. FIG. 15 is the perspective view which is viewed with a tilt with respect to the rotation axis Q from the side on which the magnetic rings 102N and 102S are held. The holder 5 is a non-magnetic body.

The holder 5 includes an outer ring 501, a middle ring 504 and an inner ring 500, and the middle ring 504 is sandwiched between the outer ring 501 and the inner ring 500 in the radial direction. The rotation shaft (not shown) is caused to penetrate through the inner ring 500.

The outer ring 501 has inner circumferential surfaces 501a, 501b and 501c on the inner circumferential side, and shows a bottom surface 501d on the side on which the magnetic rings 102N and 102S are held. The middle ring 504 shows outer circumferential surfaces 504a and 504e on the outer circumferential side, inner circumferential surfaces 504b and 504c on the inner circumferential side, and a bottom surface 504d. The inner ring 500 shows outer circumferential surfaces 500a, 500b and 500c on the outer circumferential side, and a bottom surface 500d. The bottom surfaces 500d, 501d and 504d are located at the positions which are equal in the rotation axis direction.

Plates 502 are intermittently provided in the circumferential direction between the outer ring 501 and the middle ring 504. Plates 503 are intermittently provided in the circumferential direction between the inner ring 500 and the middle ring 504. The plates 502 and 503 are alternately disposed in the circumferential direction. The plates 502 and 503 occupy the equal position in the rotation axis direction. The plate 502 shows a bottom surface 502c on the bottom surface 504d side, and a top surface 502a on a side opposite to the bottom surface 502c. The plate 503 shows a bottom surface 503c on the bottom surface 504d side, and a top surface 503a on a side opposite to the bottom surface 503c.

The inner circumferential surface 501b is present at a position at which the plate 502 is not provided in the circumferential direction. The inner circumferential surface 501c is present at a position at which the plate 502 is provided in the circumferential direction and on the bottom surface 501d side in the rotation axis direction. The inner circumferential surface 501a is present at the position at which the plate 502 is provided in the circumferential direction and on a side opposite to the bottom surface 501d in the rotation axis direction.

The outer circumferential surface 504a is present at the position at which the plate 502 is not provided in the circumferential direction. The outer circumferential surface 504e is present at the position at which the plate 502 is provided in the circumferential direction and on the bottom surface 504d side in the rotation axis direction.

The inner circumferential surface 504b is present at a position at which the plate 503 is not provided in the circumferential direction. The inner circumferential surface 504c is present at a position at which the plate 503 is provided in the circumferential direction and on the bottom surface 504d side in the rotation axis direction.

The outer circumferential surface 500b is present at the position at which the plate 503 is not provided in the circumferential direction. The outer circumferential surface 500c is present at the position at which the plate 503 is provided in the circumferential direction and on the bottom surface 500d side in the rotation axis direction.

In the rotation axis direction, a rib 505 is provided to the plates 502 and 503 on a side opposite to the bottom surface 501d. An end of the rib 505 in the circumferential direction overlaps, in the rotation axis direction, ends of the plates 502 and 503 in the circumferential direction. The end of the plate 502 in the circumferential direction and the rib 505 form a step 502d, and the end of the plate 503 in the circumferential direction and the rib 505 form a step 503d.

The plate 502 is sandwiched between the magnetic plate 101S and the magnetic ring 102N, and the plate 503 is sandwiched between the magnetic plate 101N and the magnetic ring 102S. More specifically, the top surface 502a is in contact with the surface of the magnetic plate 101S on the magnetic ring 102N side, the bottom surface 502c is in contact with the surface of the magnetic ring 102N on the magnetic plate 101S side, the top surface 503a is in contact with the surface of the magnetic plate 101N on the magnetic ring 102S side, and the bottom surface 503c is in contact with the surface of the magnetic ring 102S on the magnetic plate 101N side. The step 109N of the magnetic ring 102N is fitted with the step 502d, and the step 109S of the magnetic ring 102S is fitted with the step 503d.

Specifically, the following technique is desirably employed for holding the rotor core 110 by the holder 5. That is, a magnetic powder is pressed with the holder 5, and the rotor core 110 is formed of a dust core.

Figure 16:
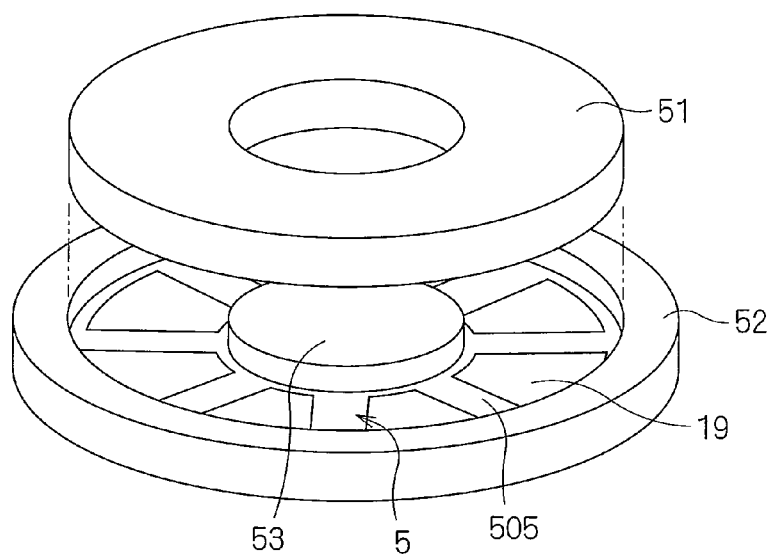
FIG. 16 is a perspective view illustrating a state in which a magnetic powder is pressed to form a rotor.

FIG. 16 is a perspective view illustrating a state of the above-mentioned pressing. A magnetic powder 19 is pressed using molds 51, 52 and 53, and the holder 5.

The mold 52 is circularly-shaped and has a bottom, and is provided on the outer circumferential side of the holder 5. The mold 53 has a cylindrical shape and is provided on the inner circumferential side of the holder 5. The mold 51 has a circular shape and is in contact with the mold 53 on an inner circumferential side thereof with an appropriate clearance. The molds 52 and 53 are formed to have a thickness larger than a thickness of the holder 5, and form a concave portion together with the holder 5. The mold 51 is pressed into the concave portion, whereby the magnetic powder 19 is pressed.

Figure 17:
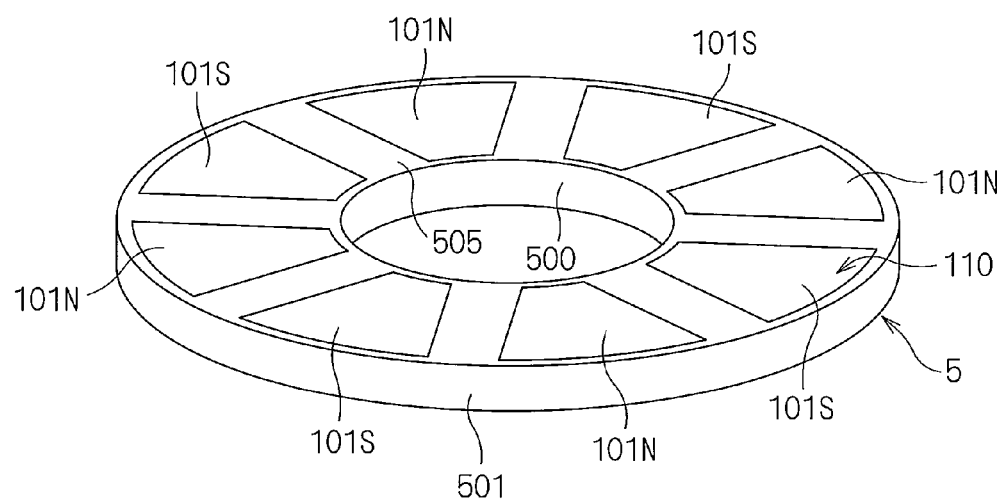
FIG. 17 is a perspective view showing the rotor in a state of being held by a holder.

FIG. 17 is a perspective view showing the rotor core 110 in the state of being held by the holder 5. In this state, the magnetic plates 101N and 101S are caught by the rib 505, the outer ring 501 and the inner ring 500 to be exposed.

Through pressing as described above, it is possible to obtain the rotor core 110 having the configuration shown in FIG. 5 and to cause the rotor core 110 to hold the rotation shaft via the holder 5.

Figure 18:
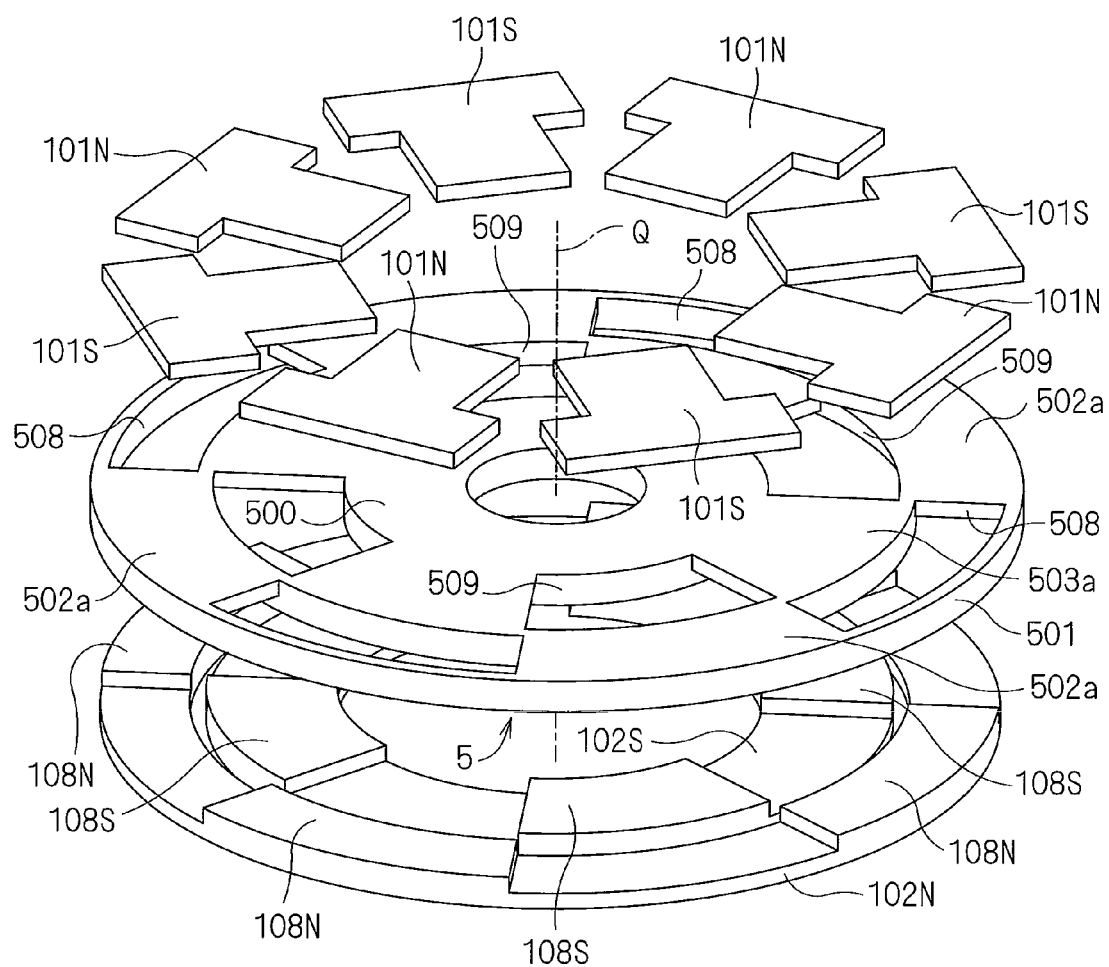
FIGS. 18 and 19 are perspective views showing a third modification of the rotor.
Figure 19:
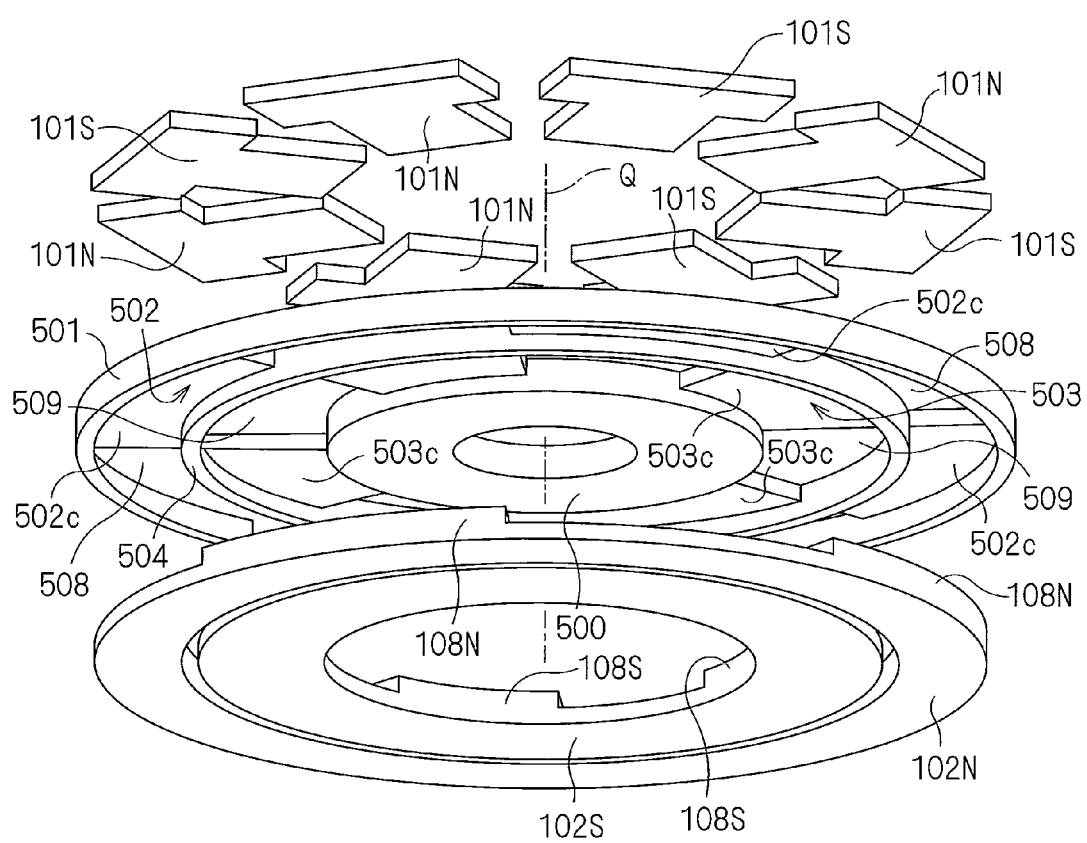

FIG. 18 and FIG. 19 are perspective views showing a third modification of the rotor core 110, which show other configurations of the non-magnetic holder 5 and the rotor core 110. FIG. 18 is the perspective view which is viewed with a tilt with respect to the rotation axis Q from the side on which the magnetic plates 101N and 101S are held. FIG. 19 is the perspective view which is viewed with a tilt with respect to the rotation axis Q from the side on which the magnetic rings 102N and 102S are held. Those perspective views show a state in which the magnetic plates 101N and 101S, the non-magnetic holder 5, and the magnetic rings 102N and 102S are disassembled along the rotation axis direction but, in actuality, they are brought into contact with each other by performing penetration described below.

The magnetic ring 102N includes a projection 108N which is coupled to the magnetic plate 101N. The magnetic ring 102S includes a projection 108S which is coupled to the magnetic plate 101S. The projections 108N and 108S project toward the rotation axis direction.

Note that the projections 108N and 108S may have the same shapes as those of the magnetic plates 100N and 100S, which have been described with reference to FIG. 8 to FIG. 11.

The magnetic plates 101N and 101S each have a shape in which two rectangles are coupled in the radial direction in FIG. 18 and FIG. 19, but may have a trapezoidal shape, a fan shape or an arc shape.

The holder 5 has a configuration shown in FIG. 14, in which the rib 505 is removed, and heights of the inner ring 500 and the outer ring 501 are reduced by a height of the rib 505 in the rotation axis direction. Accordingly, the positions of the top surfaces 502a and 503a and the positions of the top surfaces of the inner ring 500, the middle ring 504 and the outer ring 501 coincide with each other in the rotation axis direction.

Open are holes 508 each provided between a pair of plates 502 adjacent to each other in the circumferential direction and between the outer ring 501 and the middle ring 504. Open are holes 509 each provided between a pair of plates 503 adjacent to each other in the circumferential direction and between the inner ring 500 and the middle ring 504. The projections 108N and 108S penetrate through the holes 508 and 509 to be coupled to the magnetic plates 101N and 101S, respectively. Therefore, thicknesses of the plates 502 and 503 are desirably equal to or smaller than heights of the projections 108S and 108N.

In the coupling, an adhesive having magnetism may be desirably used, or welding may be desirably performed. Alternatively, as described above, molds are used to compress a magnetic powder together with the non-magnetic holder 5.

FIG. 20 is a perspective view showing a fourth modification of the rotor core 110. The magnetic plates 101N and 101S in the third modification are each modified to have an arc shape in the fourth modification. In addition, in the circumferential direction, the magnetic plates 101N and 101S are coupled to each other on the outer circumferential side and the inner circumferential side by a thin portion 101B. FIG. 20 shows a state in which the magnetic plates 101N and 101S, the non-magnetic holder 5, and the magnetic rings 102N and 102S are disassembled along the rotation axis direction but, in actuality, they are brought into contact with each other by performing penetration similar to that of the third modification.

The thin portion 101B is formed integrally with the magnetic plates 101N and 101S, and thus positioning thereof is performed with ease. For example, the thin portion 101B and the magnetic plates 101N and 101S are configured by laminating electromagnetic steel plates. The thin portion 101B essentially functions as a magnetic barrier because it is magnetically saturated with ease, whereby it is possible to avoid magnetic short-circuit between the magnetic plates 101N and 101S in the circumferential direction.

FIG. 21 is a perspective view showing a fifth modification of the rotor core 110. The fifth modification has a configuration in which the projections 108N and 108S in the third modification are replaced with concave portions 107N and 107S, respectively. The concave portions 107N and 107S are open toward the magnetic plates 101N and 101S side, and may penetrate therethrough in the rotation axis direction. FIG. 21 shows a state in which the magnetic plates 101N and 101S, the non-magnetic holder 5, and the magnetic rings 102N and 102S are disassembled along the rotation axis direction but, in actuality, they are brought into contact with each other by performing penetration described below.

The magnetic plate 101N is provided with a projection 106N on the magnetic ring 102N side. The magnetic plate 101S is provided with a projection 106S on the magnetic ring 102S side. The projections 106N and 106S penetrate through the holes 508 and 509 to be fitted with the concave portions 107N and 107S, respectively. Accordingly, the magnetic plates 101N and 101S are coupled to the magnetic rings 102N and 102S. Therefore, the thicknesses of the plates 502 and 503 are desirably equal to or less than a thickness obtained by subtracting the depths of the concave portions 107N and 107S from the heights of the projections 107N and 107S, respectively. Note that the holes 508 and 509 are different in shape from those of the third modification because the projections 106N and 106S are caused to penetrate therethrough.

Figure 22:
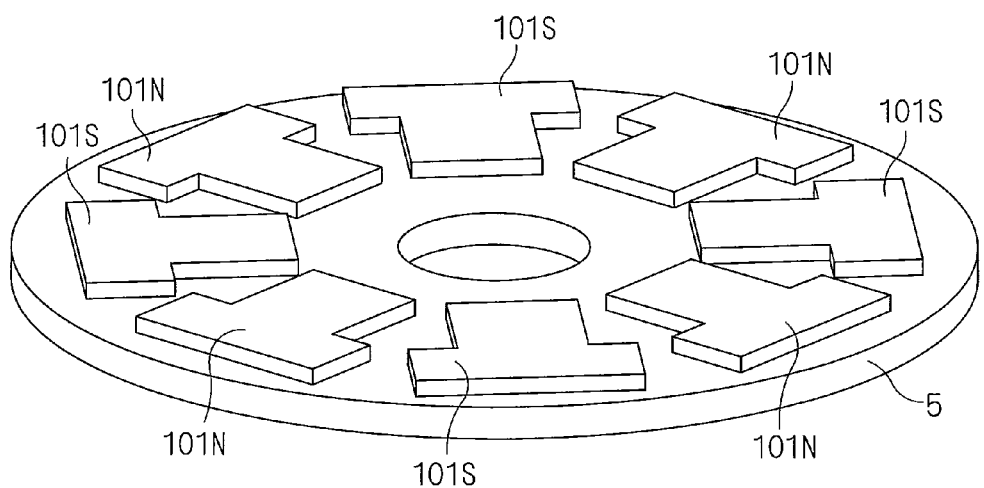
Figure 23:
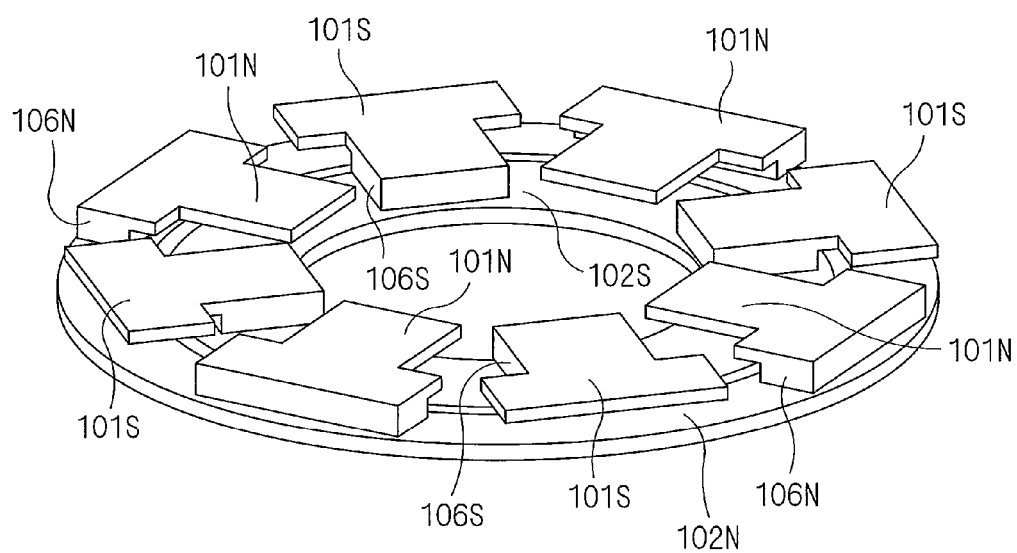

FIG. 22 is a perspective view showing a state in which the above-mentioned penetration is achieved in the fifth modification. FIG. 23 is a perspective view in which the holder 5 is removed in the state in which the above-mentioned penetration is achieved in the fifth embodiment.

In the fifth modification, the projections 106N and 106S are fitted with the concave portions 107N and 107S, respectively, whereby the magnetic plates 101N and 101S are fixed to the magnetic rings 102N and 102S, respectively, which facilitates the formation of the rotor core 110. However, in order to obtain the above-mentioned shape, the magnetic plates 101N and 101S and the magnetic rings 102N and 102S are desirably formed of a dust core.

FIG. 24 is a perspective view showing a sixth modification of the rotor core 110. In the sixth modification, the concave portions 107N and 107S are omitted from the fifth modification. In this case, a wound core is used for the magnetic rings 102N and 102S. This is because the magnetic rings 102N and 102S perform a function of causing the magnetic field flux from the stator 3 to flow in the rotation axis direction to the magnetic plates 101N and 101S which expand in the circumferential direction.

Electromagnetic steel plates laminated in the circumferential direction are used for the magnetic plate 101N provided with the projection 106N and the magnetic plate 101S provided with the projection 106S. The wound cores forming the magnetic rings 102N and 102S are desirably welded for preventing unwinding thereof. Note that positions abutting the projections 106N and 106S are desirably avoided as a position of the welding.

In a similar manner, it is desirable to perform welding on the electromagnetic steel plates forming the magnetic plate 101N provided with the projection 106N and the magnetic plate 101S provided with the projection 106S so that laminated layers are difficult to come off. However, positions abutting the magnetic rings 102N and 102S and positions on the armature 2 side are desirably avoided as the position of the welding. For example, welding is desirably performed on the outer circumferential side or the inner circumferential side.

The projections 106N and 106S are desirably fixed to the magnetic rings 102N and 102S by bonding or welding.

Figure 25:
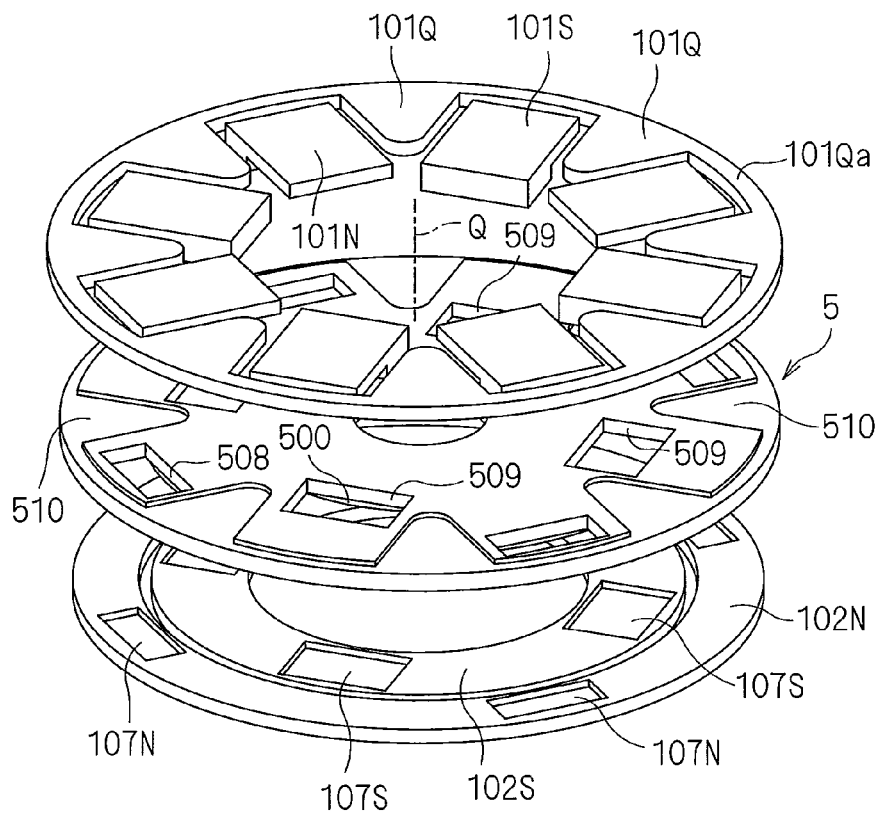
FIGS. 25 and 26 are perspective views showing a seventh modification of the rotor.

FIG. 25 is a perspective view showing a seventh modification of the rotor core 110. The seventh modification has a configuration in which magnetic bodies 101Q are added to the fifth modification. The magnetic bodies 101Q are disposed so as to alternate with the magnetic plates 101N and 101S in the circumferential direction and be magnetically separated therefrom. In this case, there is assumed a case where electromagnetic steel plates laminated in the circumferential direction are used for the magnetic plate 101N provided with the projection 106N and the magnetic plate 101S provided with the projection 106S. Accordingly, shapes thereof viewed from the rotation axis direction are rectangular. When such a shape is employed, there is generated a triangular gap which opens toward the outer circumferential side between the magnetic plates 101N and 101S. The magnetic body 101Q is provided in this gap.

That is, the magnetic bodies 101Q are circularly disposed to be opposed to the armature 2 in such a manner that positions thereof in the circumferential direction alternate with those of the magnetic plates 101N and 101S. The magnetic bodies 101Q are magnetically separated from the magnetic plates 101N and 101S.

The magnetic bodies 101Q are coupled to each other in the circumferential direction by a magnetic ring 101Qa provided on an outer circumferential side thereof. The holder 5 is provided with concave portions 510 for positioning of the magnetic bodies 101Q and the magnetic ring 101Qa, with which those are fitted.

Figure 26:
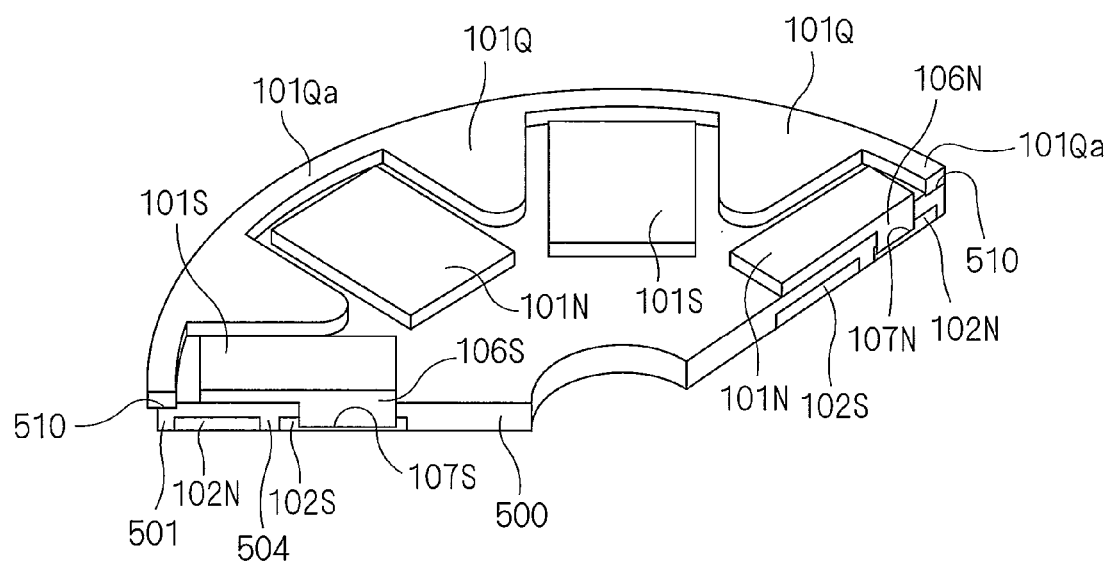

FIG. 25 shows a state in which the magnetic plates 101N and 101S, the magnetic bodies 101Q, the non-magnetic holder 5, and the magnetic rings 102N and 102S are disassembled along the rotation axis direction but, in actuality, they are brought into contact with each other by performing the above-mentioned penetration. FIG. 26 is a perspective view showing a state in which the penetration is achieved, which partially shows a cross-section. The projections 106N and 106S are fitted with the concave portions 107N and 107S, respectively, and the magnetic bodies 101Q and the magnetic ring 101Qa are fitted with the concave portions 510.

The magnetic body 101Q and the magnetic ring 101Qa perform a function of increasing an inductance in a so-called q-axis direction. This is desirable in terms of increasing a difference between a d-axis inductance and a q-axis inductance, which makes it easy to obtain reluctance torque.

FIG. 27 is a perspective view showing an eighth modification of the rotor core 110. The eighth modification has a configuration in which the steps 109N and 109S are removed from the configuration of the rotor core 110 shown in FIG. 5 and the magnetic bodies 101Q are added thereto. The magnetic bodies 101Q are disposed in the circumferential direction so as to alternate with the magnetic plates 101N and 101S and be magnetically separated therefrom. The magnetic plates 101N and 101S have an arc shape, and thus the magnetic bodies 101Q are coupled to each other in the circumferential direction by a magnetic ring 101Qb provided on the inner circumferential side thereof. Coupling of the magnetic bodies 101Q on the inner circumferential side in this manner is advantageous in terms of short magnetic path.

The magnetic field flux does not flow in the magnetic ring 101Qb. Accordingly, even when the rotation shaft (not shown) formed of a magnetic body is held on the inner circumferential side of the magnetic ring 101Qb, the magnetic field flux does not flow in the rotor core 110 via the rotation shaft in a short-circuit manner.

Figure 28:
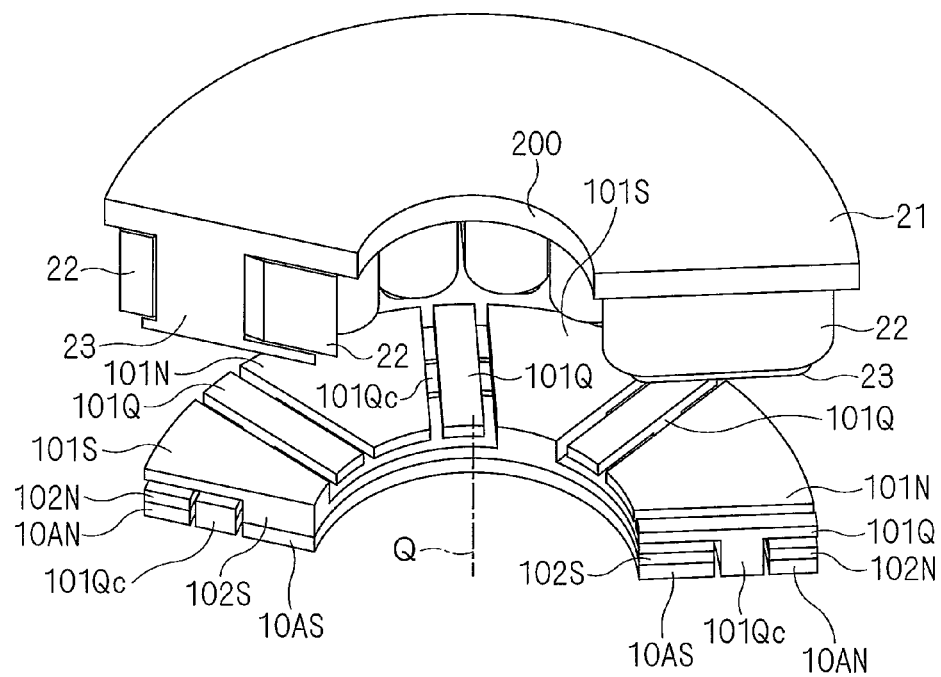
FIG. 28 is a perspective view showing a ninth modification of the rotor.
Figure 29:
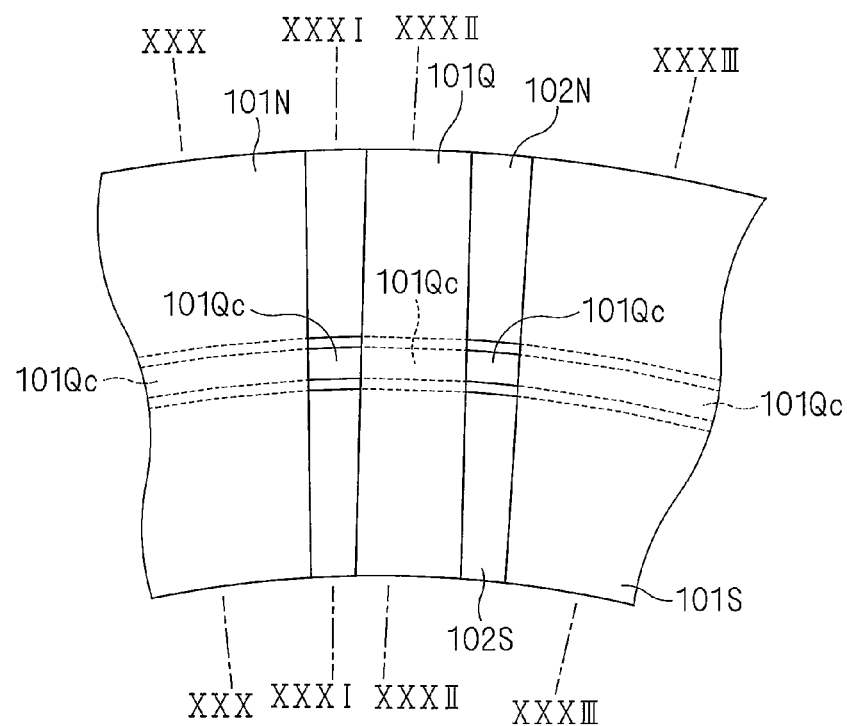
FIG. 29 is a plan view of a vicinity of a magnetic body, which is viewed from a rotation axis direction.

FIG. 28 is a partially cut-out perspective view showing a configuration of a ninth embodiment of the rotor core 110. FIG. 29 is a plan view of a vicinity of the magnetic body 101Q having this configuration, which is viewed from the rotation axis direction. FIG. 30 to FIG. 33 are cross-sectional views showing cross-sections in the circumferential direction at positions XXX-XXX, XXXI-XXXI, XXXII-XXXII and XXXIII-XXXIII of FIG. 29, respectively. In this modification, the magnetic bodies 101Q are coupled to each other in the circumferential direction between the magnetic rings 102N and 102S by a magnetic ring 101Qc.

Figure 34:
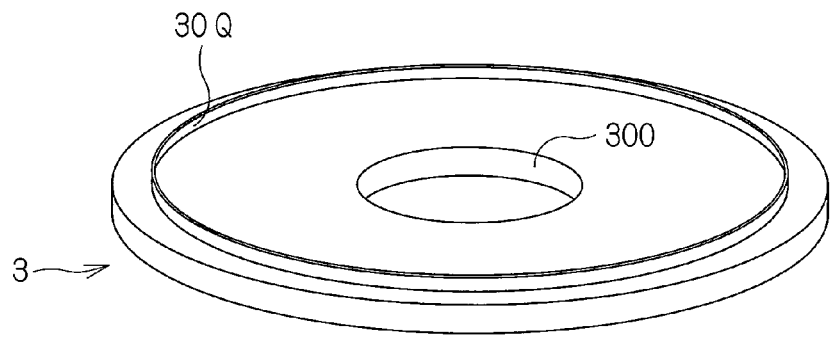
FIG. 34 is a perspective view illustrating a configuration of a stator.

Note that the function of magnetically coupling the magnetic bodies 101Q to each other may be performed by the stator 3. FIG. 34 is a perspective view illustrating the configuration of the stator 3 performing such a function. The stator 3 further includes a projection 30Q extending in the circumferential direction between the magnetic pole surfaces 10N and 10S. The projection 30Q magnetically couples the magnetic bodies 101Q included in the rotor core 110 to each other in the circumferential direction.

The projection 30Q is employed in this manner, and thus there is no need to provide the configuration for magnetically coupling the magnetic bodies 101Q to each other to the rotor 1. Therefore, it is possible to reduce an attraction force acting between the configuration for magnetically coupling the magnetic bodies 101Q to each other and the armature.

Figure 35:
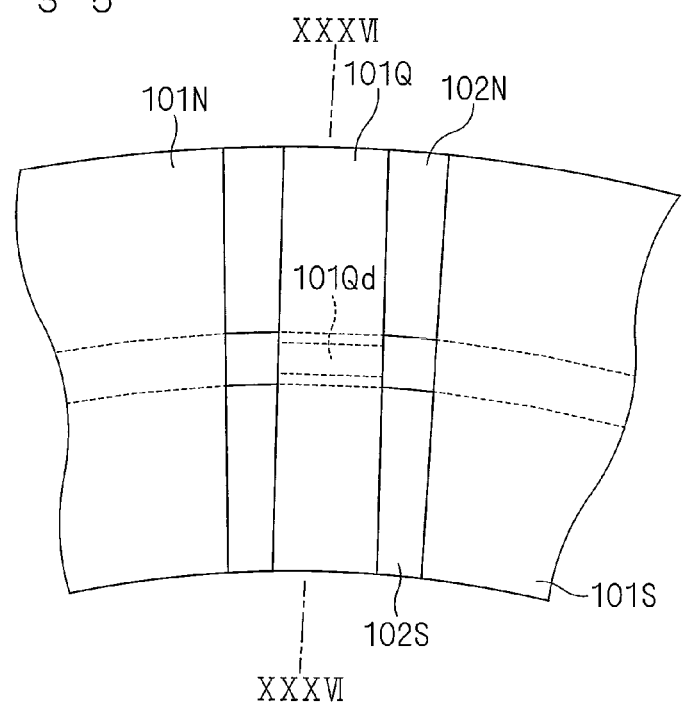
FIG. 35 is a plan view of the rotor, which is viewed from the rotation axis direction in the vicinity of the magnetic body.
Figure 36:
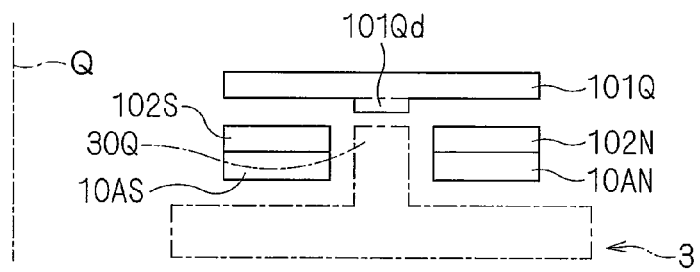
FIG. 36 is a cross-sectional view showing a cross-section at a position XXXVI-XXXVI of FIG. 35.

In a case where the stator 3 as described above is employed, the magnetic body 101Q desirably includes a projection which projects toward the stator 3 side for reducing a magnetic resistance between the magnetic body 101Q and the projection 30Q. FIG. 35 is a plan view of the rotor core 110 including a projection 101Qd, which is viewed from the rotation axis direction in the vicinity of the magnetic body 101Q. FIG. 36 is a cross-sectional view showing a cross-section in the circumferential direction at a position XXXVI-XXXVI of FIG. 35. The projections 30Q and 101Qd essentially reduce the magnetic resistance between the magnetic body 101Q and the stator 3.

Note that if the magnetic ring 101Qb and the magnetic ring 102S are coupled with the bridge B shown in FIG. 13, they can be essentially coupled to each other while being magnetically separating from each other. Alternatively, the magnetic body 101Q may be coupled to the magnetic plates 101N and 101S in the circumferential direction by a thin magnetic body.

Still alternatively, the magnetic ring 101Qb may be coupled to the magnetic plates 101N and 101S in the radial direction by a thin magnetic body. Further, the magnetic body 101Q, the magnetic plates 101N and 101S, the magnetic rings 102N, 102S, and 101Qb and the permanent magnet 10A may be integrally molded in a temporally-fixed state.

Third Embodiment

FIG. 37 is a perspective view showing a configuration of a rotary electric machine according to a third embodiment of the present invention. As in FIG. 1 referenced in the first embodiment, FIG. 37 is a perspective view which is viewed from the stator 3 side with a tilt with respect to the rotation axis Q. As in FIG. 1, air gaps between ones of the rotor 1, the armature 2 and the stator 3 are highlighted also in FIG. 37.

In the present embodiment, there will be described a configuration in which the permanent magnet 10AS is replaced with a core 10Y in the rotor 1 having the configuration described in the first embodiment. A magnetic pole in the core 10Y is induced by the permanent magnet 10AN through the stator 3.

In the rotor 1 having the configuration described in the first embodiment, the permanent magnet 10A shows both the magnetic pole surfaces 10N and 10S (see FIG. 2). Contrary to this, in the present embodiment, the magnetic pole surface 10N is shown by the permanent magnet 10AN, and the magnetic pole surface 10S is shown as a surface of the core 10Y on the rotor core 110 side. The core 10Y is provided on the magnetic ring 102S on the side opposite to the armature 2.

Alternatively, in the rotor 1 having the configuration described in the first embodiment, the permanent magnet 10AN may be replaced with a core.

Employment of the above-mentioned configuration reduces the number of permanent magnets used in the rotor 1. In addition, magnetization is capable of being performed using an air-core coil after the rotary electric machine is assembled as a motor, which facilitates the manufacturing step.

Fourth Embodiment

Figure 38:
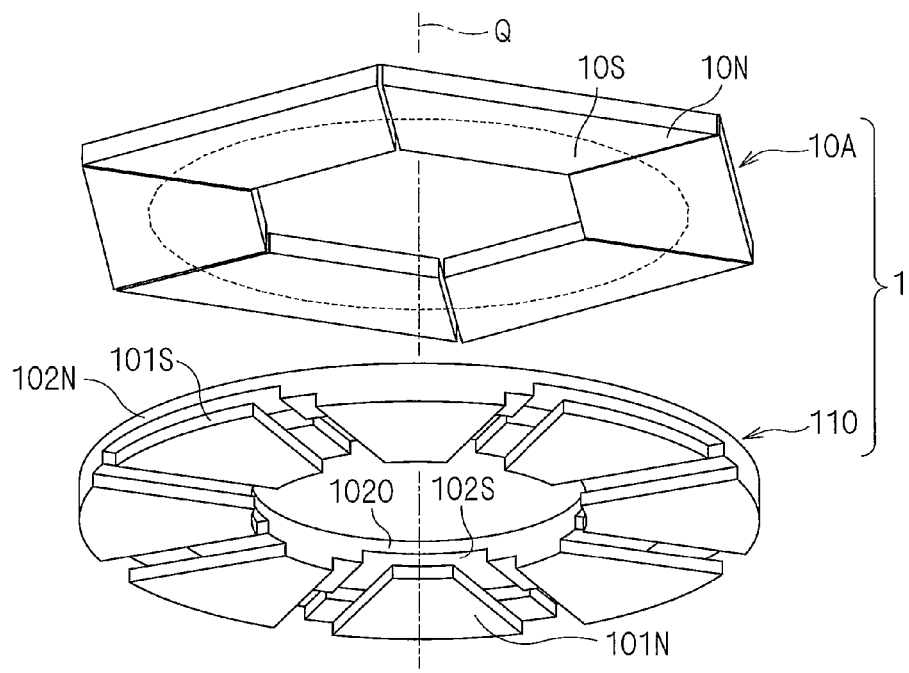
FIGS. 38 and 39 are perspective views showing a configuration of a rotary electric machine according to a fourth embodiment of the present invention.

FIG. 38 is a perspective view showing the configuration of the rotor 1 of a rotary electric machine according to the present embodiment. For easy understanding of the configuration, in FIG. 38, the permanent magnet 10A and the rotor core 110 are disassembled along the rotation axis Q. In actuality, however, they are disposed, for example, by being brought into intimate contact with each other to an extent that the magnetic flux sufficiently flows in and out in a case of forming the rotor 1.

In this configuration, as the permanent magnet 10A, the permanent magnet 10A showing both magnetic pole surfaces 10N and 10S is provided on the rotor core 110 side in place of providing by dividing it into the permanent magnets 10AN and 10AS showing the magnetic pole surfaces 10N and 10S (see FIG. 2). A boundary between the magnetic pole surface 10N and the magnetic pole surface 10S is indicated by a dotted line.

The permanent magnet 10A may be magnetized so that an inner side and an outer side of a disc-shaped magnet have magnetic poles different from each other. Such a form is achieved with ease in a case where the permanent magnet 10A is formed of a ferrite magnet or a bonded magnet.

The permanent magnet 10A may be divided into a plurality of pieces for the sake of manufacturing convenience. The division number is not particularly limited. The divided pieces of the permanent magnet 10A each have a fan-like shape or a trapezoidal shape. In particular, in a high-performance rare-earth sintered magnet, the trapezoidal shape is formed more easily in some cases. FIG. 38 illustrates a case where the permanent magnet 10A is divided into six trapezoidal-shaped pieces.

In order to prevent an eddy current from being generated particularly in the magnetic rings 102N and 102S of the rotor core 110, an air gap generated at a position at which the divided pieces of the permanent magnet 10A are adjacent to each other is desirably as small as possible.

Figure 39:
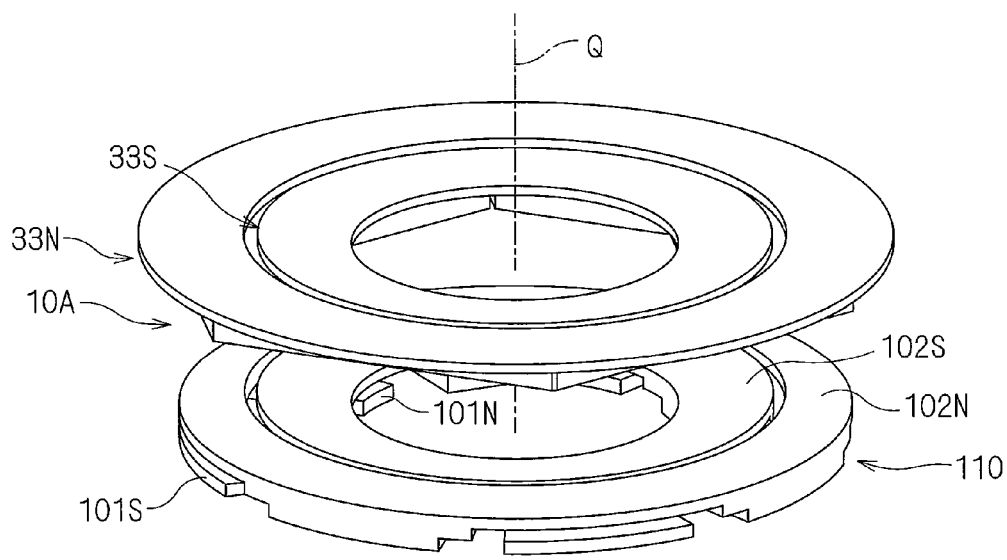

FIG. 39 is a perspective view showing the configuration of the rotor 1 according to the modification of the present embodiment. This modification has a configuration in which auxiliary cores 33N and 33S are added to the configuration shown in FIG. 38. The auxiliary cores 33N and 33S are each disposed on a surface opposite to the rotor core 110 of the permanent magnet 10A (that is, the stator 3 side of the permanent magnet 10A). An outer circumference of the auxiliary core 33N is farther from the rotation axis Q compared with an outer circumference of the permanent magnet 10A, while an inner circumference of the auxiliary core 33N is closer to the rotation axis Q compared with an inner circumference of the permanent magnet 10A. A boundary between the auxiliary cores 33N and 33S is opposed to the boundary between the magnetic pole surface 10N and the magnetic pole surface 10S.

Therefore, a possibility that an eddy current resulting from the rotation of the rotor 1 and the magnetic field flux in the stator 3 is hard to be generated irrespective of an outer shape of the permanent magnet 10A, for example, even when an outer shape thereof sticks out from the stator 3 in the radial direction.

Fifth Embodiment

FIG. 40 and FIG. 41 are perspective views showing the configuration of the rotor 1 of a motor according to a fifth embodiment of the present invention. FIG. 40 is the perspective view which is viewed with a tilt with respect to the rotation axis Q from the armature 2 side. FIG. 41 is the perspective view which is viewed with a tilt with respect to the rotation axis Q from the stator 3 side.

The rotor 1 includes a plurality of permanent magnets 10DN and 10DS, magnetic plates 105N and 105S, and magnetic rings 102N and 102S. Note that in FIG. 40 and FIG. 41, the permanent magnets 10DN and 10DS, the magnetic plates 105N and 105S, the magnetic rings 102N and 102S, and the magnetic plates 101N and 101S are disassembled along the rotation axis direction for easy understanding of the configuration of the rotor 1. FIG. 42 is a cross-sectional perspective view partially showing the rotor 1, which shows a configuration in which the magnetic plates 105N and 105S, the permanent magnets 10DN and 10DS, the magnetic plates 101N and 101S, and the magnetic rings 102N and 102S are layered along the rotation axis direction.

The permanent magnets 10DN and 10DS are alternately disposed in the circumferential direction around the rotation axis Q. The magnetic plates 105N and 105S are alternately disposed in the circumferential direction around the rotation axis Q so as to be opposed to the armature 2 (see FIGS. 1 and 2). The magnetic plates 105N and 105S are magnetically coupled to the permanent magnets 10DN and 10DS while being magnetically separated from each other. Specifically, they are fixed to the armature 2 side of the permanent magnets 10DN and 10DS.

In the present embodiment, the magnetic plate 101N couples, together with the magnetic ring 102N, a plurality of permanent magnets 10DN on the side opposite to the magnetic plate 105N, whereas the magnetic plate 101S couples, together with the magnetic ring 102S, a plurality of permanent magnets 10DS on the side opposite to the magnetic plate 105S.

With the configuration as described above, the magnetic plates 105N and 105S are interposed between the permanent magnets 10DN and DS and the armature 2. Therefore, even when the permanent magnets 10DN and 10DS are employed for the source of the magnetic field flux, they are difficult to be affected by the magnetic field generated by the armature 2. That is, the above-mentioned configuration has an advantage that it is resistant to demagnetization in terms of configuration.

Also in the present embodiment, it is possible to replace the magnetic plates 101N and 101S with the magnetic plates 100N and 100S. FIG. 43 is a cross-sectional perspective view partially showing the rotor 1 in a case where such replacement is performed, which corresponds to FIG. 42. In this configuration, areas of the magnetic plates 105N and 105S and the permanent magnets 10DN and 10DS decrease in accordance with sizes of the magnetic plates 100N and 100S.

Sixth Embodiment

Sixth to eighth embodiments will describe a configuration for reducing a thrust force between the rotor 1 and the stator 3. Generally speaking of the configuration described in the sixth embodiment, a magnetic resistance between the stator 3 and the rotor 1 is increased.

Figure 44:
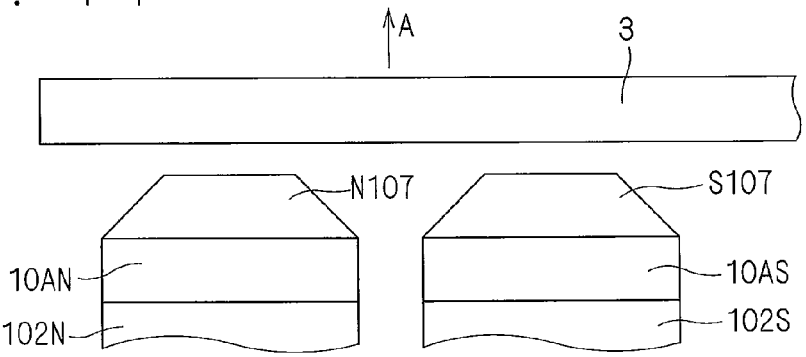
Figure 45:
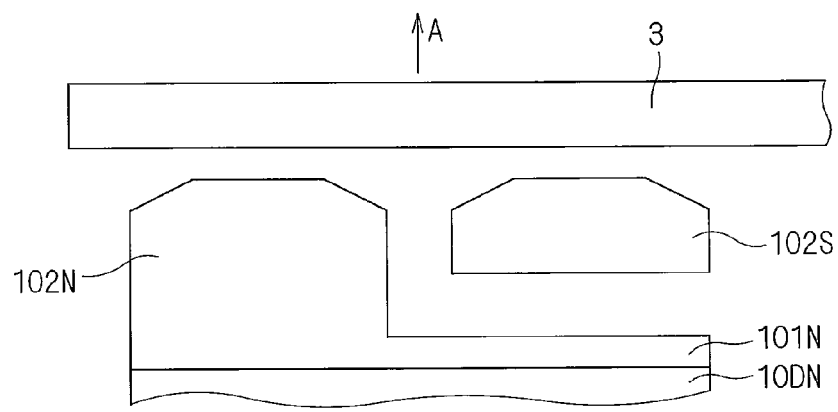
Figure 46:
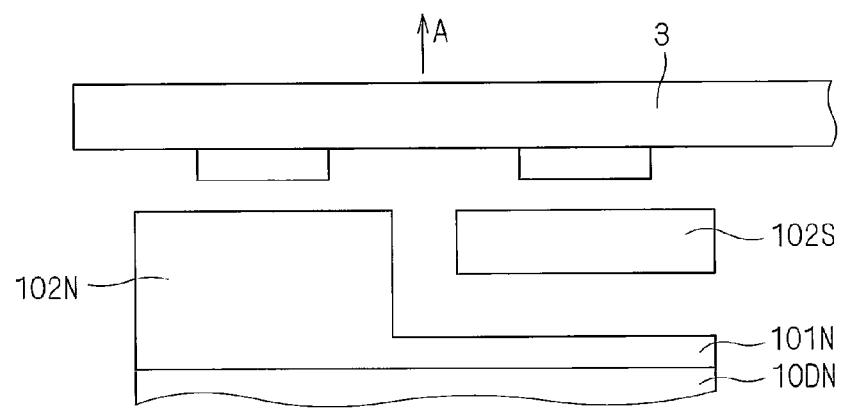

FIG. 44 to FIG. 46 are each cross-sectional views partially showing the rotor 1 and the stator 3, which show cross-sections parallel in the rotation axis direction and the radial direction. In those views, the rotation axis direction is parallel to an arrow A and is adopted in the vertical direction, while the radial direction is adopted in the horizontal direction.

The configuration shown in FIG. 44 is regarded as a modification in a case where the configuration described in the first embodiment is employed. Specifically, there is illustrated a case where the permanent magnets 10AN and 10AS are employed and cores N107 and S107 are employed on the stator 3 side thereof, respectively. The cores N107 and S107 are tapered in such a manner that cross-sectional areas thereof with respect to the rotation axis direction decrease as farther from the permanent magnets 10AN and 10AS, respectively. Therefore, if the size of the air gap between the rotor 1 and the stator 3 is the same, the magnetic resistance between the stator 3 and the rotor 1 is increased by providing the cores N107 and S107.

The configuration shown in FIG. 45 is regarded as a modification in a case where the configuration described in the fifth embodiment is employed. The magnetic rings 102N and 102S are tapered in such a manner that cross-sectional areas thereof with respect to the rotation axis direction decrease as farther from the permanent magnets 10DN and 10DS (see FIG. 40 to FIG. 42), respectively. Therefore, while the size of the air gap between the rotor 1 and the stator 3 is maintained, the magnetic resistance between the stator 3 and the rotor 1 is increased.

In the configuration shown in FIG. 46, a remaining part of the surface of the stator 3 on the rotor 1 side other than parts which face the magnetic rings 102N and 102S recedes toward the side opposite to the rotor 1. Also in this manner, the magnetic resistance between the stator 3 and the rotor 1 is increased.

Seventh Embodiment

In the present embodiment, an amount of a magnetic flux flowing between the stator 3 and the rotor 1 is reduced. FIG. 47 is a cross-sectional view partially showing the rotor 1 and the stator 3, which shows a cross-section parallel in the rotation axis direction and the radial direction. The rotation axis direction is parallel to the arrow A and is adopted in the vertical direction, while the radial direction is adopted in the horizontal direction. FIG. 48 is a perspective view showing a configuration of a motor in which the stator 3 and the rotor 1 are employed. Similarly to FIG. 1 referenced in the first embodiment, FIG. 48 is a perspective view which is viewed from the stator 3 side with a tilt with respect to the rotation axis Q. As in FIG. 1, air gaps between ones of the rotor 1, the armature 2 and the stator 3 are highlighted in FIG. 48.

The configuration shown in FIG. 48 is made such that the rotor 1 further includes a magnetic plate 106 in the configuration described in the first embodiment. The magnetic plate 106 couples respectively the of permanent magnets 10AN and 10AS to each other on the side opposite to the magnetic rings 102N and 102S.

Employment of such a configuration reduces the magnetic field flux flowing between the stator 3 and the rotor 1, which weakens the thrust force acting therebetween.

FIG. 49 is a cross-sectional view partially showing the rotor 1 and the stator 3, which shows a cross-section parallel to the rotation axis direction and the radial direction. In FIG. 49, magnetic plates N106 and S106 are provided in place of the magnetic plate 106. The magnetic plates N106 and S106 have a configuration obtained by dividing the magnetic plate 106 in the radial direction along the circumferential direction.

The magnetic field flux flowing between the magnetic plates N106 and S106 increases as a distance δ therebetween in the radial direction becomes narrower, whereby the magnetic field flux flowing between the stator 3 and the rotor 1 decreases. Accordingly, the thrust force acting therebetween decreases.

FIG. 50 is a cross-sectional view partially showing the rotor 1 having the configuration in which the magnetic plate 106 is provided in the configuration described in the fifth embodiment, and the stator 3. In this configuration, the magnetic rings 102N and 102S are magnetically coupled to each other on the side opposite to the permanent magnets 10DN and 10DS. In this configuration, the magnetic plate 106 may be replaced with the magnetic plates N106 and S106 shown in FIG. 49.

Eighth Embodiment

In the present embodiment, a radial component of the magnetic field flux flowing between the stator 3 and the rotor 1 is increased, which accordingly reduces a rotational-axial component thereof.

The rotational-axial component of the magnetic field flux is reduced, and thus the thrust force decreases. Although the radial component of the magnetic field flux is increased, the magnetic field fluxes having different polarities flow in parallel in the radial direction. Accordingly, there are two types of attraction forces acting between the rotor 1 and the stator 3, which are canceled with each other.

FIG. 51 to FIG. 56 and FIG. 59 to FIG. 63 are each cross-sectional views partially showing the rotor 1 and the stator 3, which show cross-sections parallel in the rotation axis direction and the radial direction. In those views, the rotation axis direction is parallel to the arrow A and is adopted in the vertical direction, while the radial direction is adopted in the horizontal direction.

Figure 51:
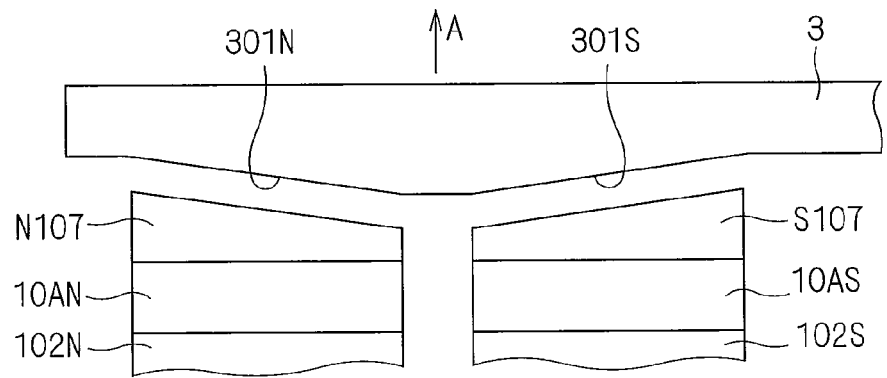

FIG. 51 is regarded as a modification in a case where the configuration described in the first embodiment is employed. Specifically, there is illustrated a case in which the permanent magnets 10AN and 10AS are employed and cores N107 and S107 are employed on the stator 3 side thereof. The cores N107 and S107 are tilted in a direction in which surfaces thereof on the stator 3 side face each other. The stator 3 projects toward the rotor 1 side, and show surfaces 301N and 301S tilted in a direction so as to be opposed to each other. Therefore, the cores N107 and S107 approximately squarely face the surfaces 301N and 301S, respectively.

Compared with a case where the stator 3 and the permanent magnet 10AN are perpendicular to the rotation axis direction, in the magnetic field flux flowing between the surface 301N and the core N107 which are tilted as described above, a rotational-axial component thereof decreases. Therefore, in the attraction force acting between the stator 3 and the core N107, a component parallel to the rotation axis thereof decreases. In a similar manner, also in the attraction force acting between the stator 3 and the core S107, a component parallel to the rotation axis thereof decreases. Therefore, the thrust force acting between the rotor 1 and the stator 3 decreases.

The radial component of the attraction force acting between the surface 301N and the core N107 is canceled out with the radial component of the attraction force acting between the surface 301S and the core S107, and hence a force acting between the rotor 1 and the stator 3 in the radial direction is neglected.

As described above, it is possible to reduce the thrust force acting between the rotor 1 and the stator 3 without increasing an unnecessary force in the radial direction.

Figure 52:
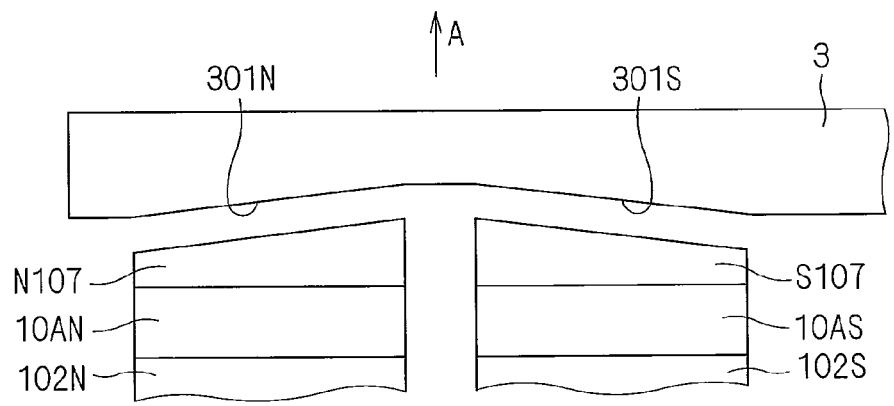

FIG. 52 shows a configuration in which all directions of tilt of the cores N107 and S107 and the surfaces 301N and 301S are reverse to those of the configuration shown in FIG. 51. That is, the surfaces 301N and 301S are tilted in directions so as to face each other, and the stator 3 is dented with respect to the rotor 1 side. Surfaces of the cores N107 and S107 on the stator 3 side are tilted so as to be opposed to each other. Therefore, the cores 107N and 107S approximately squarely face the surfaces 301N and 301S, respectively, whereby the thrust force is reduced in the similar manner to the configuration shown in FIG. 51.

Figure 53:
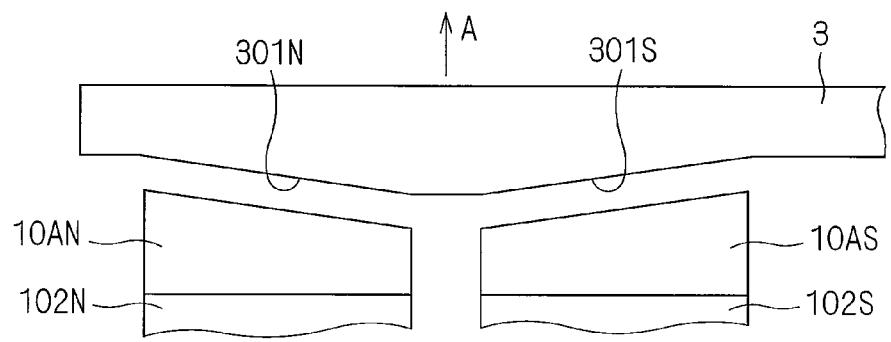
Figure 54:
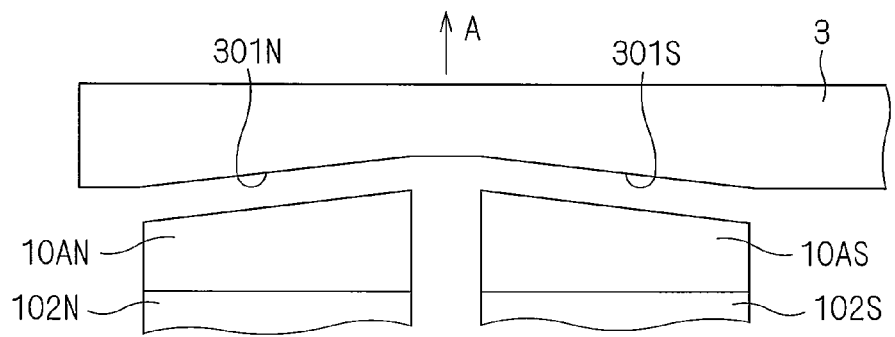

Note that the cores N107 and S107 are omitted if the permanent magnets 10AN and 10AS are not difficult to be processed. FIG. 53 and FIG. 54 have configurations corresponding to FIG. 51 and FIG. 52, respectively, which show the configurations in which the surfaces shown by the cores 107N and 107S with a tilt with respect to the stator 3 side are formed by the permanent magnets 10AN and 10AS, respectively. Needless to say, the above-mentioned effect is achieved also with the above-mentioned configuration.

Figure 55:
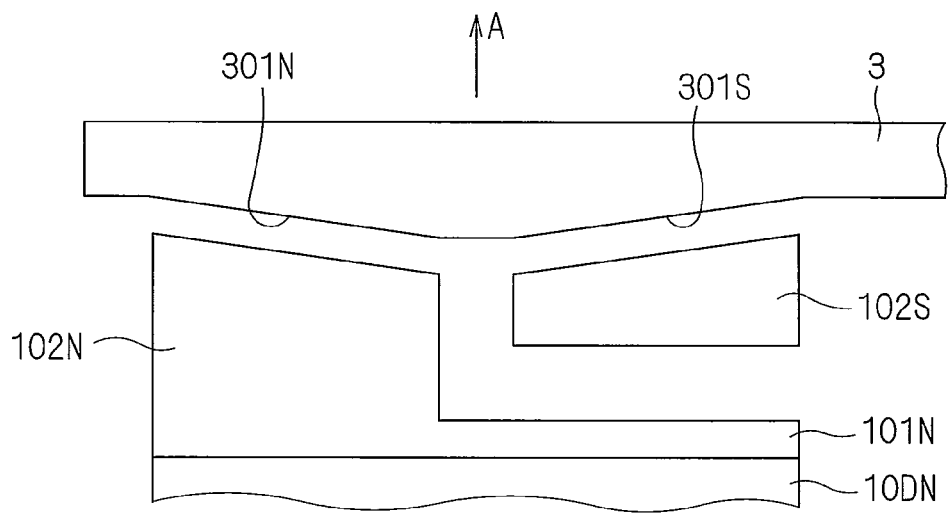
Figure 56:
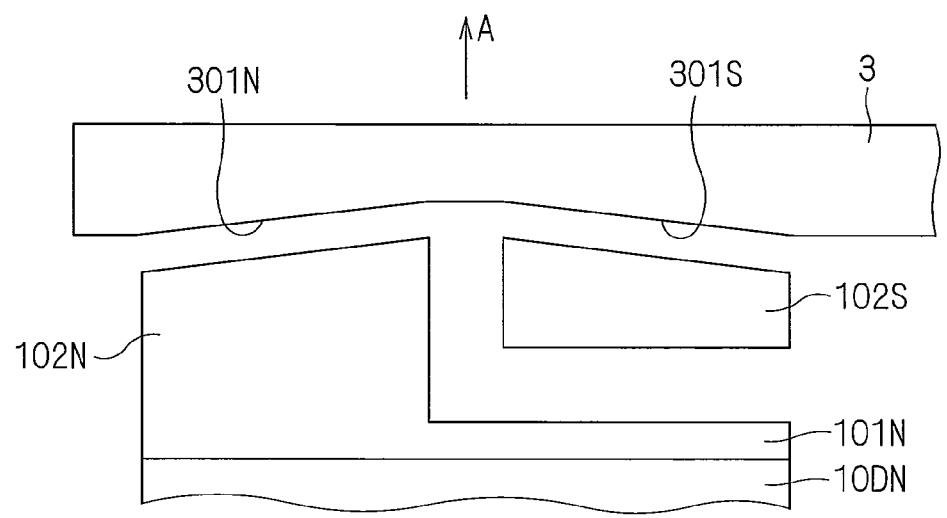

FIG. 55 and FIG. 56 correspond to FIG. 51 and FIG. 52, respectively, which are regarded as a modification in a case where the configuration described in the fifth embodiment is employed. There is shown the configuration in which the surfaces shown by the cores N107 and S107 with a tilt with respect to the stator 3 side in the configurations shown in FIG. 51 and FIG. 52 are formed by the magnetic rings 102N and 102S, respectively. Needless to say, the above-mentioned effect is achieved also with the above-mentioned configuration.

Also if the surface of the stator 3 on the rotor 1 side is not tilted but is formed in a step-like shape, the rotational-axial component of the magnetic field flux is reduced. In this case, the surfaces of the permanent magnets 10AN and 10AS and the magnetic rings 102N and 102S on the stator 3 side are not required to be tilted, and also the cores N107 and S107 are not required.

Figure 57:
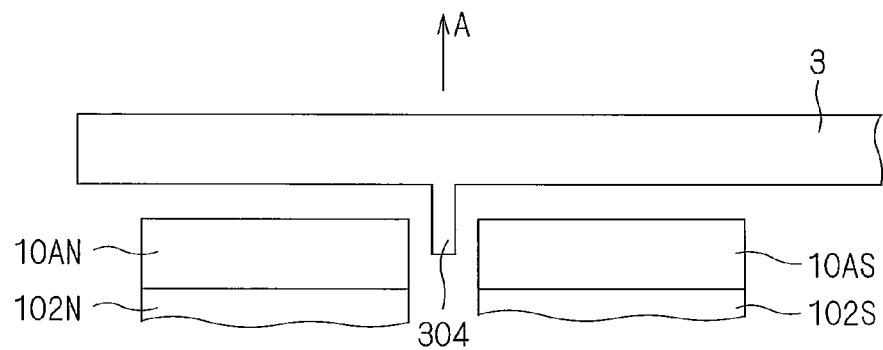
Figure 58:
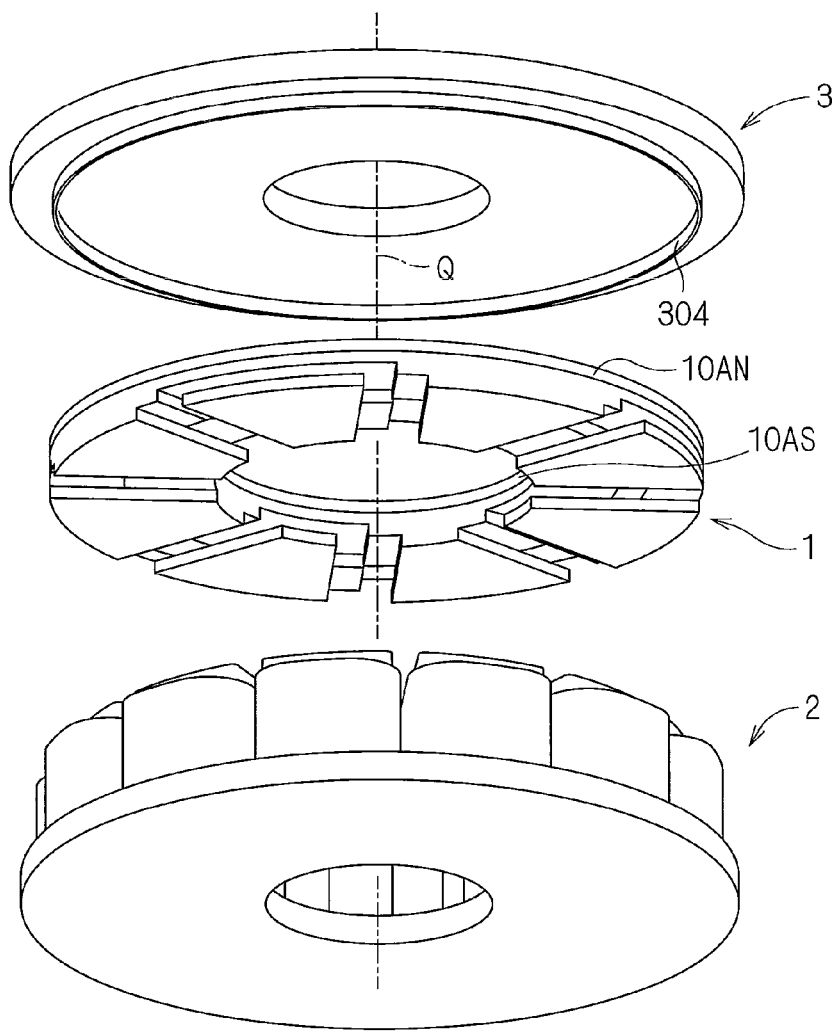
FIG. 58 is a perspective view showing a configuration of a rotary electric machine according to an eighth embodiment of the present invention.

FIG. 57 is a cross-sectional view partially showing the rotor 1 and the stator 3, which shows a cross-section parallel in the rotation axis direction and the radial direction. The rotation axis direction is parallel to the arrow A and is adopted in the vertical direction, while the radial direction is adopted in the horizontal direction. FIG. 58 is a perspective view showing a configuration of a motor in which the stator 3 and the rotor 1 are employed. As in FIG. 2 referenced in the first embodiment, FIG. 58 is the perspective view which is viewed from the armature 2 side with a tilt with respect to the rotation axis Q. As in FIG. 1, air gaps between ones of the rotor 1, the armature 2 and the stator 3 are highlighted in FIG. 58.

The stator 3 includes a ring-shaped projection 304 which is inserted between the permanent magnets 10AN and 10AS in a non-contact manner (in FIG. 58, the projection 304 is not caused to be inserted between the permanent magnets 10AN and 10AS, and this is because FIG. 58 is shown in such a manner that the distance between the stator 3 and the rotor 1 is created).

In the configuration as described above, the force acting between the rotor 1 and the stator 3 includes an attraction force acting between the projection 304 and the permanent magnet 10AN and an attraction force acting between the projection 304 and the permanent magnet 10AS. Accordingly, the rotational-axial component of the magnetic field flux reduces. Moreover, in those two attraction forces, the radial components thereof are canceled out with each other. Therefore, it is possible to reduce the thrust force acting between the rotor 1 and the stator 3 without increasing an unnecessary force in the radial direction.

FIG. 59 shows a configuration in which the stator 3 is caused to project toward the rotor 1 side along the rotation axis direction. The stator 3 includes protruding portions 31N and 31S on a side closer to outer circumferential side compared with the permanent magnet 10AN and a side closer to an inner circumferential side compared with the permanent magnet 10AS, respectively.

In the configuration as described above, the force acting between the rotor 1 and the stator 3 includes the attraction force acting between the protruding portion 31N and the permanent magnet 10AN and the attraction force acting between the protruding portion 31S and the permanent magnet 10AS. Accordingly, the rotational-axial component of the magnetic field flux reduces. Moreover, in those two attraction forces, the radial components thereof are canceled out with each other. Therefore, it is possible to reduce the thrust force acting between the rotor 1 and the stator 3 without increasing an unnecessary force in the radial direction.

FIG. 60 and FIG. 61 show configurations in which the cores N107 and S107 are provided on the stator 3 side of the permanent magnets 10AN and 10AS, respectively, in the configurations shown in FIG. 57 and FIG. 59. Needless to say, the above-mentioned effect is achieved also with the above-mentioned configuration.

Figure 62:
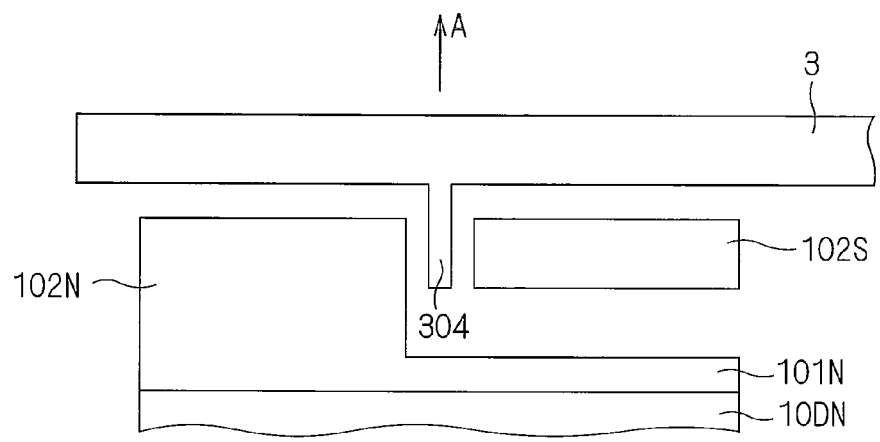
Figure 63:
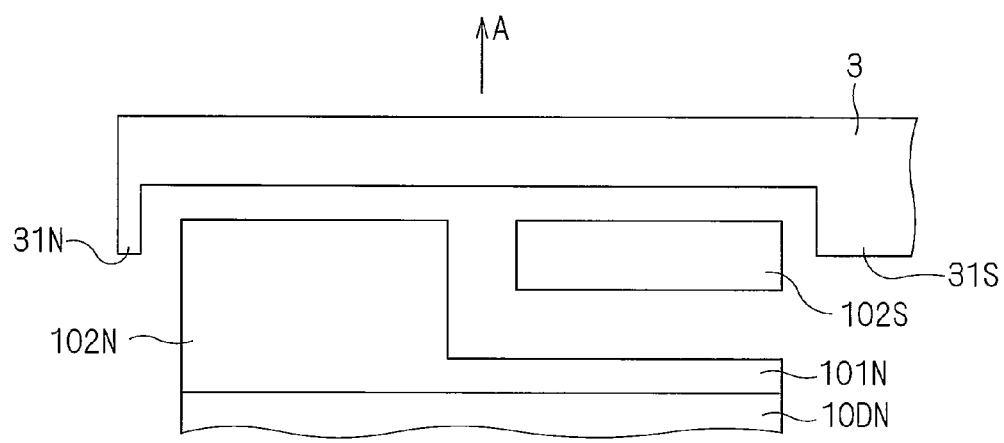

FIG. 62 and FIG. 63 correspond to FIG. 57 and FIG. 59, respectively, which are regarded as a modification in a case where the configuration described in the fifth embodiment is employed.

In the configuration shown in FIG. 62, the projection 304 is interposed between the magnetic rings 102N and 102S in a non-contact manner. In the configuration shown in FIG. 63, the stator 3 includes protruding portions 31N and 31S on a side closer to the outer circumferential side compared with the magnetic ring 102N and a side closer to the inner circumferential side compared with the magnetic ring 102S, respectively.

The projection 304 may double as the projection 30Q which has been described with reference to FIG. 34 to FIG. 36.

Ninth Embodiment

FIG. 64 is a perspective view showing a configuration of a rotary electric machine according to a ninth embodiment. The stator 3 includes a magnetic field coil 32 which is wound in the circumferential direction. A position of the magnetic field coil 32 in the radial direction is located between the magnetic rings 102N and 102S.

An end 32a of the magnetic field coil 32 is drawn from the stator 3 on the side opposite to the magnetic pole surfaces 10N and 10S. A current is caused to flow through the magnetic field coil 32 via the end 32a, and the current is adjusted, whereby adjustment of the magnetic field flux is facilitated.

For example, a rotary electric machine is employed as a motor, and when large torque is required for the motor, a current for generating a magnetic flux of the same polarity as the magnetic field flux is caused to flow for increasing the magnetic field flux. In a case where a motor is rotated at high speed, a current for generating a magnetic flux of a polarity opposite to the magnetic field flux is caused to flow to weaken the magnetic field flux (which is so-called field weakening), whereby induced voltage is reduced. In contrast, in a case where the motor is rotated at low speed, a current for generating a magnetic flux of the same polarity as the magnetic field flux is caused to flow to increase the magnetic field flux, whereby torque is increased.

This results in high-speed operation as well as low-speed operation with high efficiency, which is particularly suitable for an on-vehicle motor. When it is used as a generator, the magnetic field flux is adjusted in accordance with fluctuations in the number of revolutions, and thus a required voltage is generated irrespective of the number of revolutions, which is particularly suitable for an on-vehicle alternator. Alternatively, when it is used as a train motor, it is possible to reduce the magnetic field flux in a coasting operation in which relatively long drive is performed.

The magnetic field coil 32 may be used for magnetization after providing a magnetic body which is a material of the permanent magnets 10AN and 10AS. It goes without saying that the armature 2 is used together in the magnetization.

FIG. 65 is a cross-sectional view showing a configuration in a case in which the magnetic body 101Q and the magnetic ring 101Qc (see FIG. 29 to FIG. 33) are employed, which shows a cross-section at a position corresponding to XXXII-XXXII of FIG. 29. The magnetic field coil 32 is provided at a position facing the magnetic ring 101Qc, and thus a thickness of the magnetic ring 101Qc in the rotation axis direction is desired to be smaller compared with the case shown in FIG. 32.

Combination of Modifications

The various modifications described in the respective embodiments above can be combined unless functions thereof are not impaired with each other. For example, it is possible to employ various modifications of the stator 3 independently of the modifications of the rotor 1. Further, for example, the magnetic field coil 32 described in the ninth embodiment may be provided in the stator 3 of the rotary electric machine according to other embodiment.

Application to Compressor

Figure 66:
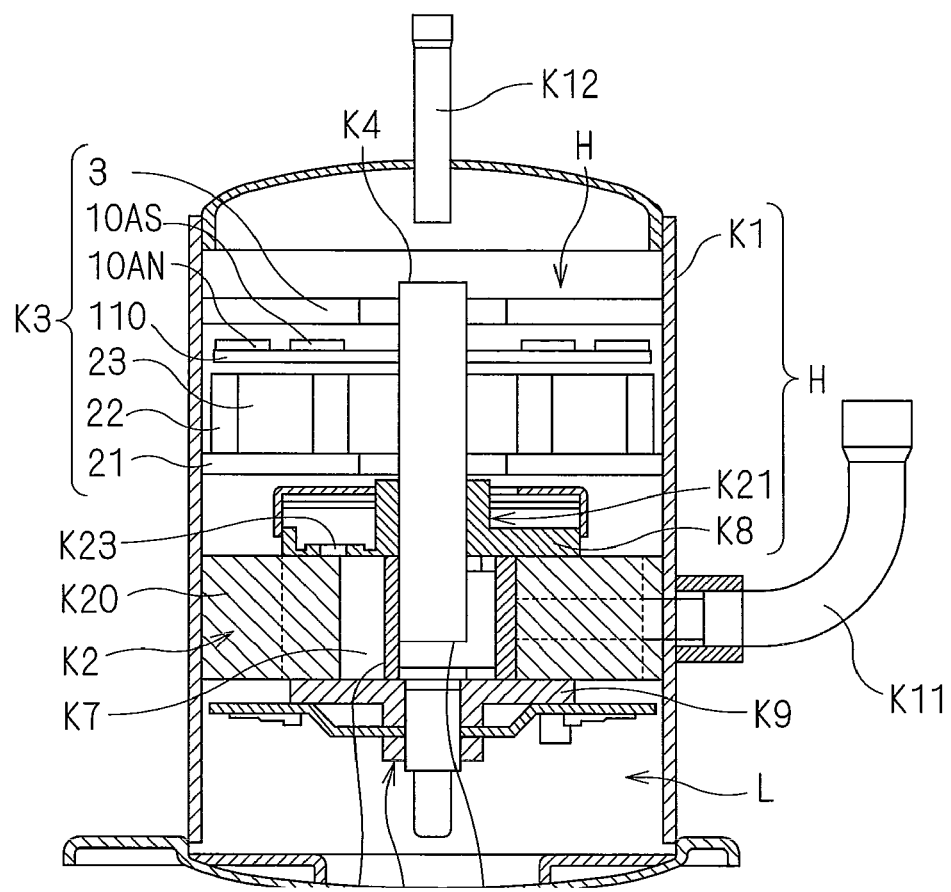
FIGS. 66 and 67 are longitudinal cross-sectional views of a compressor to which the above-mentioned rotary electric machine is applied.

FIG. 66 is a longitudinal cross-sectional view of a compressor in which the rotary electric machine described above is applied as a motor. The compressor shown in FIG. 66 is a high-pressure dome-type rotary compressor and, for example, carbon dioxide is used for a refrigerant thereof.

This compressor includes a hermetic container K1, a compression mechanism portion K2 and a motor K3. The compression mechanism portion K2 is disposed within the hermetic container K1. The motor K3 is disposed in the hermetic container K1 and on an upper side of the compression mechanism portion K2. Here, the upper side refers to an upper side along the central axis of the hermetic container K1 irrespective of whether or not the central axis of the hermetic container K1 is tilted with respect to a horizontal surface.

The motor K3 drives the compression mechanism portion K2 via a rotation shaft K4. The motor K3 has the configuration described in the embodiments above.

A suction pipe K11 is connected to a lateral side of the hermetic container K1 on a lower side, while a discharge pipe K12 is connected to an upper side of the hermetic container K1. A refrigerant gas (not shown) is supplied from the suction pipe K11 to the hermetic container K1 and is guided to an intake side of the compression mechanism portion K2. This rotary compressor is upright, and includes an oil tank provided at least in a bottom of the motor K3.

An inside of the hermetic container K1 is defined into a high-pressure region H and a low-pressure region L with the compression mechanism portion K2 sandwiched therebetween. The high-pressure region H is filled with a high-pressure refrigerant gas discharged from the compression mechanism portion K2. The motor K3 is disposed in the high-pressure region H.

The yoke 21 and the stator 3 are disposed on a side closer to the outer circumference with respect to the rotation shaft K4 compared with the rotor 1 (which is shown by dividing into the rotor core 110 and the permanent magnets 10AS and 10AN in the drawing), and are fixed to the hermetic container K1.

The compression mechanism portion K2 includes a cylinder-shaped main body K20, an upper end plate K8 and a lower end plate K9. The upper end plate K8 and the lower end plate K9 are mounted onto upper and lower opening ends of the main body K20, respectively. The rotation shaft K4 penetrates through the upper end plate K8 and the lower end plate K9, and is inserted into the inside of the main body K20. The rotation shaft K4 is rotatably supported by a bearing K21 provided to the upper end plate K8 and a bearing K22 provided to the lower end plate 9.

A crank pin K5 is provided to the rotation shaft K4 within the main body K20. A piston K6 is fitted with the crank pin K5 to be driven. A compression chamber K7 is formed between the piston K6 and a cylinder corresponding thereto. The piston K6 rotates in a state of being decentered or revolves, to thereby change a volume of the compression chamber K7.

Next, an operation of the above-mentioned rotary compressor will be described. The refrigerant gas is supplied from the suction pipe K11 to the compression chamber K7. The compression mechanism portion K2 is driven by the motor K3, whereby the refrigerant gas is compressed. The compressed refrigerant gas is transmitted, together with refrigerating machine oil (not shown), from the compression mechanism portion K2 to the upper side of the compression mechanism portion K2 via a discharge hole K23, and further via the motor K3 to be discharged from the discharge pipe K12 to an outside of the hermetic container K1.

The refrigerant gas moves within the motor K3 toward the upper side thereof together with the refrigerating machine oil. The refrigerant gas is guided to the upper side compared with the motor K3, whereas the refrigerating machine oil travels toward an inner wall of the hermetic container K1 by the centrifugal force of the rotor 1. The refrigerating machine oil adheres to the inner wall of the hermetic container K1 in a state of fine particles to be liquefied, and then returns to the upper stream side of a flow of the refrigerant gas of the motor K3 by the action of gravity.

Figure 67:
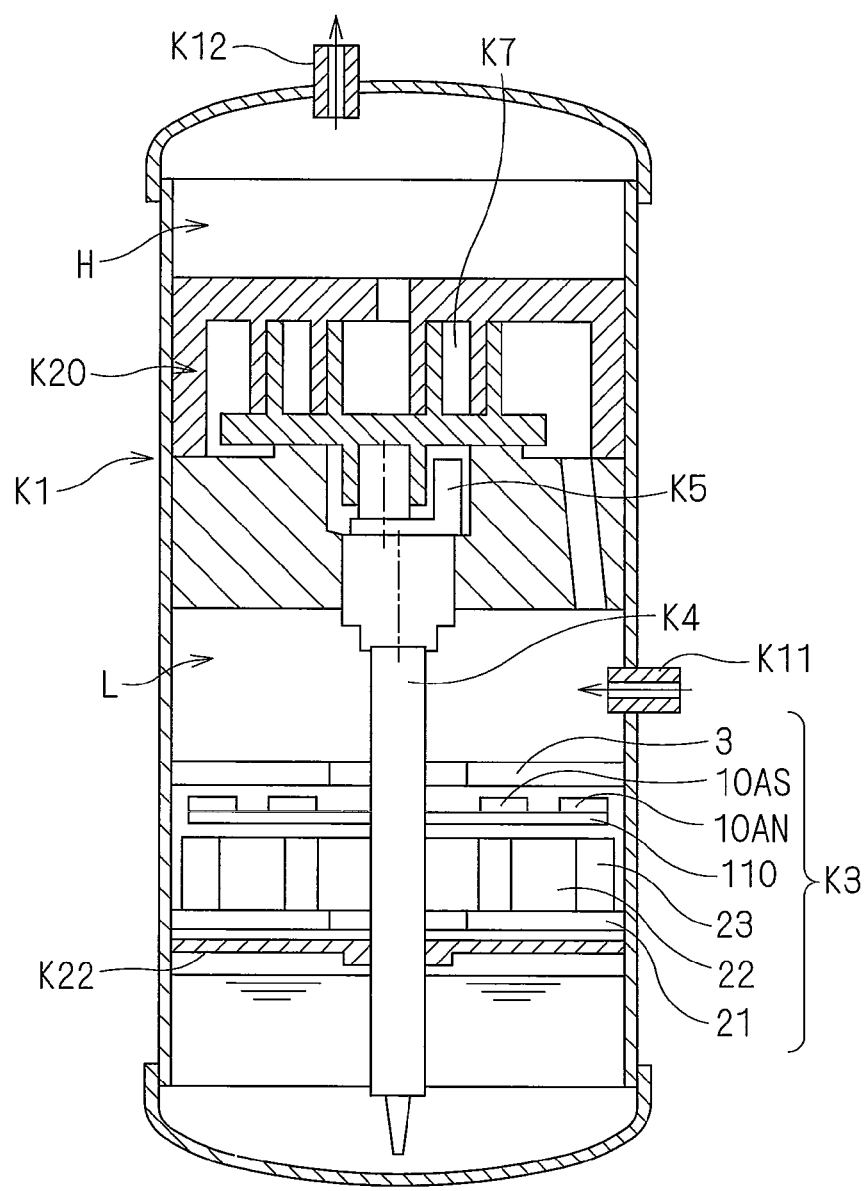

FIG. 67 is a longitudinal cross-sectional view of a compressor to which the motor according to the embodiment described above is applied. The compressor shown in FIG. 67 is a low-pressure dome-type scroll compressor and, for example, carbon dioxide is used for a refrigerant thereof.

Also in this compressor, the motor K3 is disposed in the hermetic container K1 and drives the compression mechanism portion K2 via the rotation shaft K4. The compression mechanism portion K2 has a scroll mechanism.

An inside of the hermetic container K1 is divided into the high-pressure region H and the low-pressure region L with the compression mechanism portion K2 being sandwiched therebetween. However, the motor K3 is disposed in the low-pressure region L. That is, the compression mechanism portion K2 is disposed on the upper side compared with the motor K3.

While the invention has been shown and described in detail, the foregoing description is in all aspects illustrative and not restrictive. It is therefore understood that numerous modifications and variations can be devised without departing from the scope of the invention.

The invention claimed is:

1. An axial gap rotary electric machine, comprising:
a field element capable of rotating in a circumferential direction about a rotation axis and generating a magnetic field flux;
an armature opposed to said field element from one side in a rotation axis direction parallel to said rotation axis, including an armature coil interlinked with said magnetic field flux, in which an armature current flows; and
a stator comprising a magnetic body and being opposed to said field element from another side in said rotation axis direction,
wherein said field element includes:
a first magnetic ring disposed around said rotation axis and supplying said magnetic field flux of a first polarity;
a second magnetic ring disposed on a side closer to said rotation axis compared with said first magnetic ring and supplying said magnetic field flux of a second polarity;
a first magnetic plate circularly disposed in said circumferential direction so as to be opposed to said armature, magnetically separated from said second magnetic ring, and magnetically coupled to said first magnetic ring; and
a second magnetic plate circularly disposed so as to be opposed to said armature with positions thereof in said circumferential direction alternating with the first magnetic plate, magnetically separated from said first magnetic ring and said first magnetic plate, and magnetically coupled to said second magnetic ring.

2. The axial gap rotary electric machine according to claim 1, wherein:
a side opposite to said rotation axis of said first magnetic plate is coupled to said first magnetic ring and extends in a radial direction so as to reach said armature side of said second magnetic ring; and
said rotation axis side of said second magnetic plate is coupled to said second magnetic ring and extends in the radial direction so as to reach said armature side of said first magnetic ring.

3. The axial gap rotary electric machine according to claim 1, further comprising:
a first magnetic pole surface supplying said first magnetic ring with said magnetic field flux of said first polarity;
a second magnetic pole surface supplying said second magnetic ring with said magnetic field flux of said second polarity; and
a permanent magnet supplying said first magnetic pole surface and said second magnetic pole surface with said magnetic field flux.

4. The axial gap rotary electric machine according to claim 3, wherein said permanent magnet shows at least any one of said first magnetic pole surface and said second magnetic pole surface.

5. The axial gap rotary electric machine according to claim 4, wherein:
said permanent magnet shows any one of said first magnetic pole surface and said second magnetic pole surface; and
said field element further includes a yoke magnetically coupled to said permanent magnet and showing another of said first magnetic pole surface and said second magnetic pole surface.

6. The axial gap rotary electric machine according to claim 4, wherein:
said permanent magnet includes:
a first ring-shaped permanent magnet showing said first magnetic pole surface and generating said magnetic field flux of said first polarity; and
a second ring-shaped permanent magnet showing said second magnetic pole surface, being disposed on said side closer to said rotation axis compared with said first ring-shaped permanent magnet, and generating said magnetic field flux of said second polarity; and
said stator includes a ring-shaped projection inserted between said first ring-shaped permanent magnet and said second ring-shaped permanent magnet in a non-contact manner.

7. The axial gap rotary electric machine according to claim 4, wherein:
said permanent magnet includes:
a first ring-shaped permanent magnet showing said first magnetic pole surface and generating said magnetic field flux of said first polarity; and
a second ring-shaped permanent magnet showing said second magnetic pole surface, being disposed on said side closer to said rotation axis compared with said first ring-shaped permanent magnet, and generating said magnetic field flux of said second polarity; and
said field element further includes a third magnetic plate magnetically coupling said first permanent magnet and said second permanent magnet to each other on a side opposite to said first magnetic ring and said second magnetic ring.

8. The axial gap rotary electric machine according to claim 4, wherein said field element further includes a plurality of magnetic bodies circularly disposed so as to be opposed to said armature with positions thereof in said circumferential direction alternating with the first magnetic plate and the second magnetic plate, and magnetically coupled to each other while being magnetically separated from said first magnetic ring and said second magnetic ring.

9. The axial gap rotary electric machine according to claim 8, wherein said field element further includes a magnetic ring coupling said plurality of magnetic bodies to each other in the circumferential direction on the side opposite to said rotation axis.

10. The axial gap rotary electric machine according to claim 8, wherein said field element further includes a magnetic ring coupling said plurality of magnetic bodies to each other in the circumferential direction between said first magnetic ring and said second magnetic ring.

11. The axial gap rotary electric machine according to claim 8, wherein said field element further includes a magnetic ring coupling said plurality of magnetic bodies to each other in the circumferential direction on the side of said rotation axis.

12. The axial gap rotary electric machine according to claim 8, wherein said stator further includes a projection being in proximity to said plurality of magnetic bodies.

13. The axial gap rotary electric machine according to claim 1, wherein:
   said stator includes a magnetic field coil wound in said circumferential direction, for generating said magnetic field flux; and
   a position of said magnetic field coil in the radial direction is located between said first magnetic ring and said second magnetic ring.

14. An axial gap rotary electric machine, comprising:
   a field element capable of rotating in a circumferential direction about a rotation axis and generating a magnetic field flux;
   an armature opposed to said field element from one side in a rotation axis direction parallel to said rotation axis, including an armature coil interlinked with said magnetic field flux, in which an armature current flows; and
   a stator comprising a magnetic body and being opposed to said field element from another side in said rotation axis direction and,
   wherein said field element includes:
      a plurality of first permanent magnets disposed around said rotation axis and supplying said magnetic field flux of a first polarity;
      a plurality of second permanent magnets disposed in said circumferential direction around said rotation axis so as to alternate with said first permanent magnets and supplying said magnetic field flux of a second polarity;
      a first magnetic plate circularly disposed in said circumferential direction so as to be opposed to said armature, and magnetically coupled to said first permanent magnets;
      a second magnetic plate circularly disposed so as to be opposed to said armature with positions thereof in said circumferential direction alternating with the first magnetic plate, magnetically separated from said first magnetic plate, and magnetically coupled to said second permanent magnets;
      a first magnetic ring coupling said plurality of first permanent magnets to each other on a side opposite to said first magnetic plate and said second magnetic plate; and
      a second magnetic ring coupling said plurality of second permanent magnets to each other on the side opposite to said first magnetic plate and said second magnetic plate.

15. The axial gap rotary electric machine according to claim 14, wherein:
   said side opposite to said rotation axis of said first magnetic plate is coupled to said first magnetic ring and extends in a radial direction so as to reach said armature side of said second magnetic ring; and
   said rotation axis side of said second magnetic plate is coupled to said second magnetic ring and extends so as to reach said armature side of said first magnetic ring.

16. The axial gap rotary electric machine according to claim 14, wherein said stator includes a ring-shaped projection inserted between said first magnetic ring and said second magnetic ring in a non-contact manner.

17. The axial gap rotary electric machine according to claim 14, wherein said field element further includes a third magnetic plate magnetically coupling said first magnetic ring and said second magnetic ring to each other on a side opposite to said first permanent magnet and said second permanent magnetism magnet.

18. The axial gap rotary electric machine according to claim 14, wherein:
   said stator includes a magnetic field coil wound in said circumferential direction, for generating said magnetic field flux; and
   a position of said magnetic field coil in the radial direction is located between said first magnetic ring and said second magnetic ring.

* * * * *